(12) United States Patent
Okumura et al.

(10) Patent No.: US 11,452,150 B2
(45) Date of Patent: Sep. 20, 2022

(54) INFORMATION PROCESSING DEVICE, INFORMATION PROCESSING METHOD, TRANSMITTER, TRANSMISSION METHOD, RECEIVER, RECEPTION METHOD

(71) Applicant: Sony Semiconductor Solutions Corporation, Kanagawa (JP)

(72) Inventors: Hiroyuki Okumura, Kanagawa (JP); Toshihiro Fujiki, Kanagawa (JP); Kentaro Nakahara, Kanagawa (JP); Seiji Kobayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/057,123

(22) PCT Filed: May 17, 2019

(86) PCT No.: PCT/JP2019/019624
§ 371 (c)(1),
(2) Date: Nov. 20, 2020

(87) PCT Pub. No.: WO2019/230439
PCT Pub. Date: Dec. 5, 2019

(65) Prior Publication Data
US 2021/0195662 A1 Jun. 24, 2021

(30) Foreign Application Priority Data
May 31, 2018 (JP) .............................. JP2018-104247

(51) Int. Cl.
*H04W 76/11* (2018.01)
*H04W 76/15* (2018.01)
(Continued)

(52) U.S. Cl.
CPC .............. *H04W 76/11* (2018.02); *H04W 8/24* (2013.01); *H04W 56/0015* (2013.01); *H04W 76/15* (2018.02)

(58) Field of Classification Search
CPC ... H04W 76/11; H04W 56/0015; H04W 8/24; H04W 76/15
(Continued)

(56) References Cited

U.S. PATENT DOCUMENTS 11,151,594 B1 * 10/2021 Moran ............... G06Q 30/0611
2003/0217168 A1 * 11/2003 Adachi ................... H04L 45/00
709/229

(Continued)

FOREIGN PATENT DOCUMENTS

JP 2009-543381 A 12/2009
JP 2017-152766 A 8/2017
(Continued)

OTHER PUBLICATIONS

International Search Report and Written Opinion dated Aug. 6, 2019, received for PCT Application No. PCT/JP2019/019624, filed on May 17, 2019, 10 pages including English Translation.
(Continued)

*Primary Examiner* — Congvan Tran
(74) *Attorney, Agent, or Firm* — Xsensus LLP

(57) ABSTRACT

The present technology relates to an information processing device, an information processing method, a transmitter, a transmission method, a receiver, and a reception method which can provide setting information necessary for each receiver. An information processing device of one aspect of the present technology holds non-common setting information that is not common setting information among setting information used in transmitters for setting for transmitting information in association with identification information of
(Continued)

the respective transmitters. In addition, the information processing device transmits, to a receiver that has received identification information transmitted from a predetermined transmitter using common setting information that is setting information common in the plurality of transmitters, the non-common setting information associated with the identification information received by the receiver. The present technology can be applied, for example, to a communication system in which data is transmitted from a transmitter to a receiver through unidirectional communication.

9 Claims, 18 Drawing Sheets

(51) Int. Cl.
*H04W 8/24* (2009.01)
*H04W 56/00* (2009.01)

(58) Field of Classification Search
USPC .................................................. 370/328–329
See application file for complete search history.

(56) References Cited

U.S. PATENT DOCUMENTS

| | | | | |
|---|---|---|---|---|
| 2007/0249344 | A1* | 10/2007 | Hosono | H04W 36/00835 455/435.1 |
| 2009/0249454 | A1* | 10/2009 | Yamamoto | H04W 12/06 726/5 |
| 2013/0142171 | A1* | 6/2013 | Hosono | H04W 36/00835 370/331 |
| 2013/0176897 | A1* | 7/2013 | Wang | H04W 12/0431 370/254 |
| 2017/0374531 | A1 | 12/2017 | Nolan | |
| 2018/0070384 | A1* | 3/2018 | Kitagawa | H04W 74/0833 |
| 2018/0083898 | A1* | 3/2018 | Pham | H04W 4/14 |
| 2018/0120132 | A1 | 5/2018 | Tanutama | |
| 2018/0317106 | A1* | 11/2018 | Konstantinou | H04W 24/08 |
| 2020/0367071 | A1* | 11/2020 | Hashimoto | H04W 76/11 |
| 2021/0103004 | A1* | 4/2021 | Nishimura | G05B 19/4185 |

FOREIGN PATENT DOCUMENTS

| | | |
|---|---|---|
| JP | 6259550 B1 | 1/2018 |
| WO | 2018/011874 A1 | 1/2018 |

OTHER PUBLICATIONS

Bor Martin et al: "LoRa Transenssion Parameter Selection", 2017 13th International Conference on Distributed Computing in Sensor Systems (DCOSS) IEEE, Jun. 5, 2017 (Jun. 5, 2017), pp. 27-34, XF033307535, D0I: 10.1109/DCOSS.2017.10 [retrieved on Jan. 26, 2018]* the whole document *.

* cited by examiner

Fig. 2

| DEVICE ID | TRANSMISSION PARAMETER |
|---|---|
| 111111111 | P1 |
| 111111112 | P2 |
| 111111113 | P3 |
| ⋮ | ⋮ |

Fig. 4

| SYNCHRONIZATION SIGNAL | DEVICE ID | 0 PADDING |

INFORMATION PROCESSING DEVICE, INFORMATION PROCESSING METHOD, TRANSMITTER, TRANSMISSION METHOD, RECEIVER, RECEPTION METHOD

CROSS-REFERENCE TO RELATED APPLICATIONS

The present application is based on PCT filing PCT/JP2019/019624, filed May 17, 2019, which claims priority to JP 2018-104247, filed May 31, 2018, the entire contents of each are incorporated herein by reference.

TECHNICAL FIELD

The present technology relates to an information processing device, an information processing method, a transmitter, a transmission method, a receiver, and a reception method, and particularly, to an information processing device, an information processing method, a transmitter, a transmission method, a receiver, and a reception method which can provide setting information necessary for each receiver.

BACKGROUND ART

Recently, low power wide area (LPWA) communication has received attraction. LPWA communication is wireless communication that allows data transmission within a wide range with a radius of about tens of kilometers while curbing power consumption of terminals.

PTL 1 discloses a unidirectional communication system using LPWA communication. In the communication system disclosed in PTL 1, a transmitter transmits data according to predetermined transmission parameters and a receiver receives data transmitted from each transmitter using transmission parameters of each transmitter acquired from a server. The server needs to provide (register) transmission parameters of a transmitter that is a reception target for each receiver.

CITATION LIST

Patent Literature

[PTL 1]
JP 6259550B

SUMMARY

Technical Problem

To prevent unnecessary transmission parameter reception processing from occurring, it is desirable that only transmission parameters of a transmitter present within a reception area of each receiver be provided by a server.

An object of the present technology devised in view of such circumstances is to enable provision of setting information necessary for each receiver.

Solution to Problem

An information processing device of a first aspect of the present technology includes: a management unit which holds non-common setting information that is not common setting information among setting information used in transmitters for setting for transmitting information in association with identification information of the respective transmitters; and a communication unit which transmits, to a receiver that has received the identification information transmitted from a predetermined transmitter using common setting information that is the setting information common in the plurality of transmitters, the non-common setting information associated with the identification information received by the receiver.

A transmitter of a second aspect of the present technology includes a transmission unit which transmits identification information thereof according to common setting information that is common in a plurality of other transmitters among setting information used for setting for transmitting information and transmits predetermined information according to non-common setting information that is not common setting information.

A receiver of a third aspect of the present technology includes: a reception unit which receives identification information transmitted from a predetermined transmitter according to common setting information that is common in a plurality of transmitters among setting information used in the transmitters for setting for transmitting information; and an acquisition unit which acquires non-common setting information associated with the received identification information from an information processing device which holds the non-common setting information that is not common setting information in association with the identification information of the respective transmitters.

In the first aspect of the present technology, non-common setting information that is not common setting information among setting information used in transmitters for setting for transmitting information is held in association with identification information of the respective transmitter. Furthermore, for a receiver that has received the identification information transmitted from the predetermined transmitter using common setting information that is the setting information common in the plurality of transmitters, the non-common setting information associated with the identification information received by the receiver is transmitted.

In the second aspect of the present technology, identification information of the transmitter is transmitted according to common setting information that is common in a plurality of other transmitters among setting information used for setting for transmitting information, and predetermined information is transmitted according to non-common setting information that is not common setting information.

In the third aspect of the present technology, identification information transmitted from the predetermined transmitter is received according to common setting information that is common in the plurality of transmitters among setting information used in the transmitters for setting for transmitting information, and non-common setting information associated with the received identification information is acquired from an information processing device which holds the non-common setting information that is not common setting information in association with the identification information of the respective transmitters.

Advantageous Effects of Invention

According to the present technology, it is possible to provide setting information necessary for each receiver.

Meanwhile, effects described here are not limited and may include any effect described in the present disclosure.

BRIEF DESCRIPTION OF DRAWINGS

FIG. 2 is a diagram showing an example of management of transmission parameters.

FIG. 4 is a diagram showing a configuration example of a control frame.

DESCRIPTION OF EMBODIMENTS

Hereinafter, forms for embodying the present technology will be described. Description will be given in the following order.

1. Overall operation of communication system
2. Example of communication method
3. Configuration example of each device
4. Operation of each device
5. Modified examples <Overall Operation of Communication System>

Figure 1:
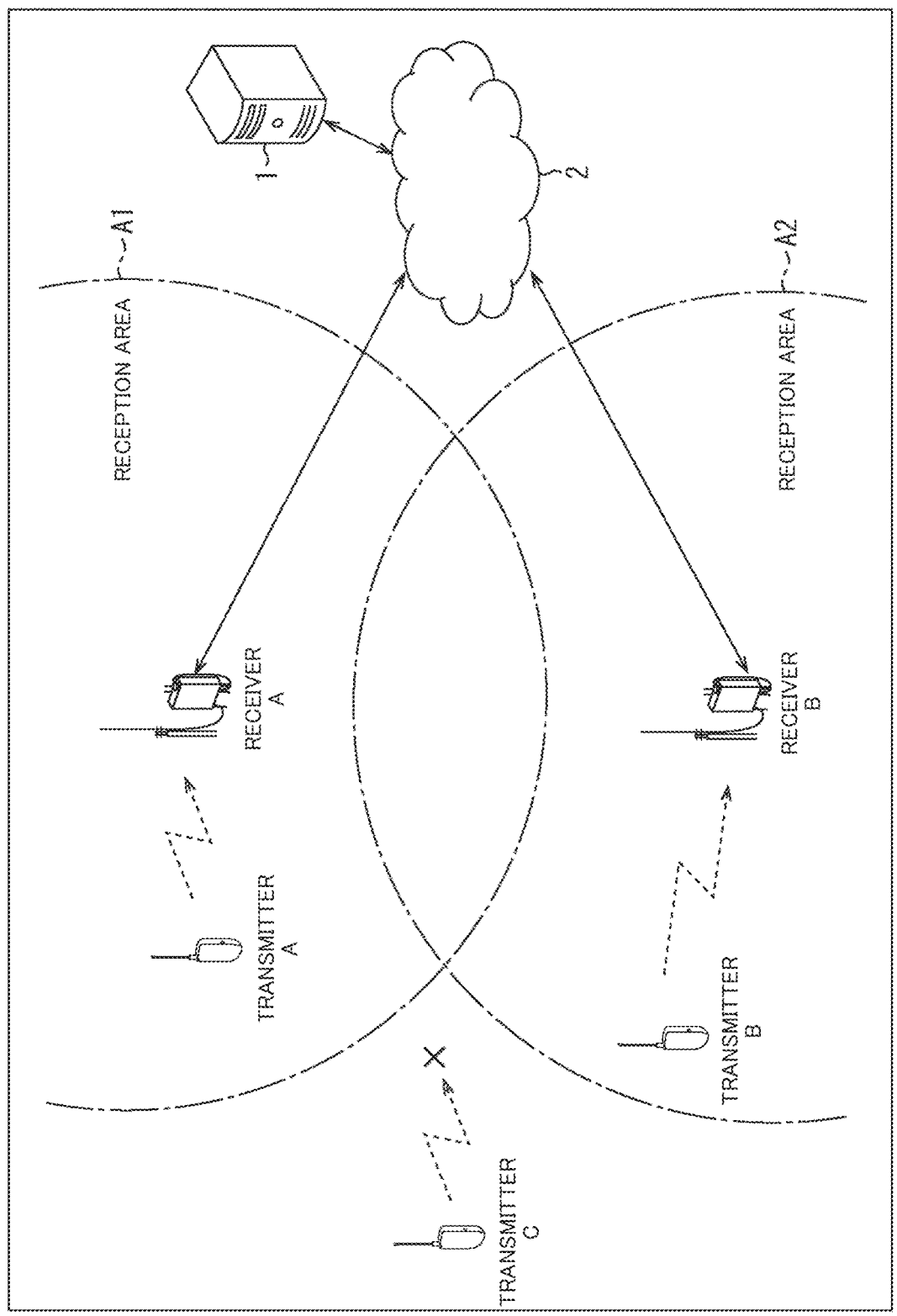
FIG. 1 is a diagram showing a configuration example of a communication system according to an embodiment of the present technology.

FIG. 1 is a diagram showing a configuration example of a communication system according to an embodiment of the present technology.

The communication system of FIG. 1 is a wireless communication system using low power wide area (LPWA) communication. A receiver serving as a base station receives data transmitted from a transmitter present in a reception area managed thereby. Transmission of data is performed, for example, through unidirectional communication using 920 MHz band in Japan.

In the example of FIG. 1, a receiver A that manages a reception area A1 and a receiver B that manages a reception area A2 are shown. The reception area A1 and the reception area A2 are areas with a radius of about tens of kilometers, for example.

In addition, in the example of FIG. 1, a transmitter A is present in the reception area A1 and a transmitter B is present in the reception area A2. The receiver A receives data transmitted from the transmitter A. In addition, the receiver B receives data transmitted from the transmitter B.

In practice, more receivers are provided and more transmitters are present in a reception area of each receiver to construct the communication system.

Meanwhile, as shown at the left of FIG. 1, a transmitter C is not present in any of the reception area A1 and the reception area A2. Data transmitted by the transmitter C does not reach the receiver A and the receiver B.

A receiver is a device fixed to a predetermined position such as a rooftop of a building or a telegraph pole, whereas a transmitter is a device carried by a user or attached to a moving body such as a vehicle, for example. The position of a transmitter is likely to be moved.

For example, the transmitter A present in the reception area A1 may be present in the reception area A1 at a certain timing, as shown in FIG. 1, and present in the reception area A2 or another reception area which is not illustrated at another timing.

This communication system is used, for example, for a position management system which manages the position of each transmitter, and the like. In this case, a positioning function using a global positioning system (GPS) or the like is mounted in transmitters.

Each transmitter periodically transmits position information acquired by performing positioning along with a device ID, for example. A device ID is identification information allocated to each transmitter in advance.

Each receiver receives position information and a device ID transmitted from a transmitter present in the reception area managed thereby and transmits the position information and the device ID to a predetermined server on the Internet. In the server, position information of each time is managed in association with the device ID of each transmitter. Position information of a transmitter managed in the server is used to provide a service of notifying the position of the transmitter, that is, the position of a user carrying the transmitter, and the like.

The server that is a transmission destination of transmitted data transmitted from a transmitter may be a cloud server 1.

In this communication system, each transmitter performs transmission of data using a transmission parameter set in each transmitter as individual information. The transmission parameters are setting information used for setting for transmitting data.

The transmission parameters include, for example, a time division multiplexing parameter, a frequency division multiplexing parameter, and synchronization pattern information. The synchronization pattern information is information representing a pattern of a synchronization signal added to a frame.

Transmitted data such as position information is multiplexed according to a multiplexing method represented by a time division multiplexing parameter and the frequency division multiplexing parameter has a synchronization signal of a pattern represented by synchronization pattern information added thereto and is transmitted, as will be described later.

The transmitter A of FIG. 1 transmits data using a transmission parameter thereof. To receive the data transmitted from the transmitter A, the receiver A needs to perform setting using the same transmission parameter as the transmission parameter used by the transmitter A to transmit the data.

In the same manner, the transmitter B transmits data using transmission parameter thereof. To receive the data transmitted from the transmitter B, the receiver B needs to perform setting using the same transmission parameter as the transmission parameter used by the transmitter B to transmit the data.

The transmission parameter of each transmitter managed in the cloud server 1.

FIG. 2 is a diagram showing an example of management of transmission parameters.

As shown in FIG. 2, the transmission parameter of each transmitter is managed (held) in association with a device ID, for example. In the example of FIG. 2, transmission parameters P1 to P3 are managed respectively in association with device IDs "1111111111", "1111111112" and "1111111113".

The cloud server 1 transmits transmission parameters used to receive data in each receiver to each receiver through the Internet 2 and registers (provides) the transmission parameters.

Figure 3:
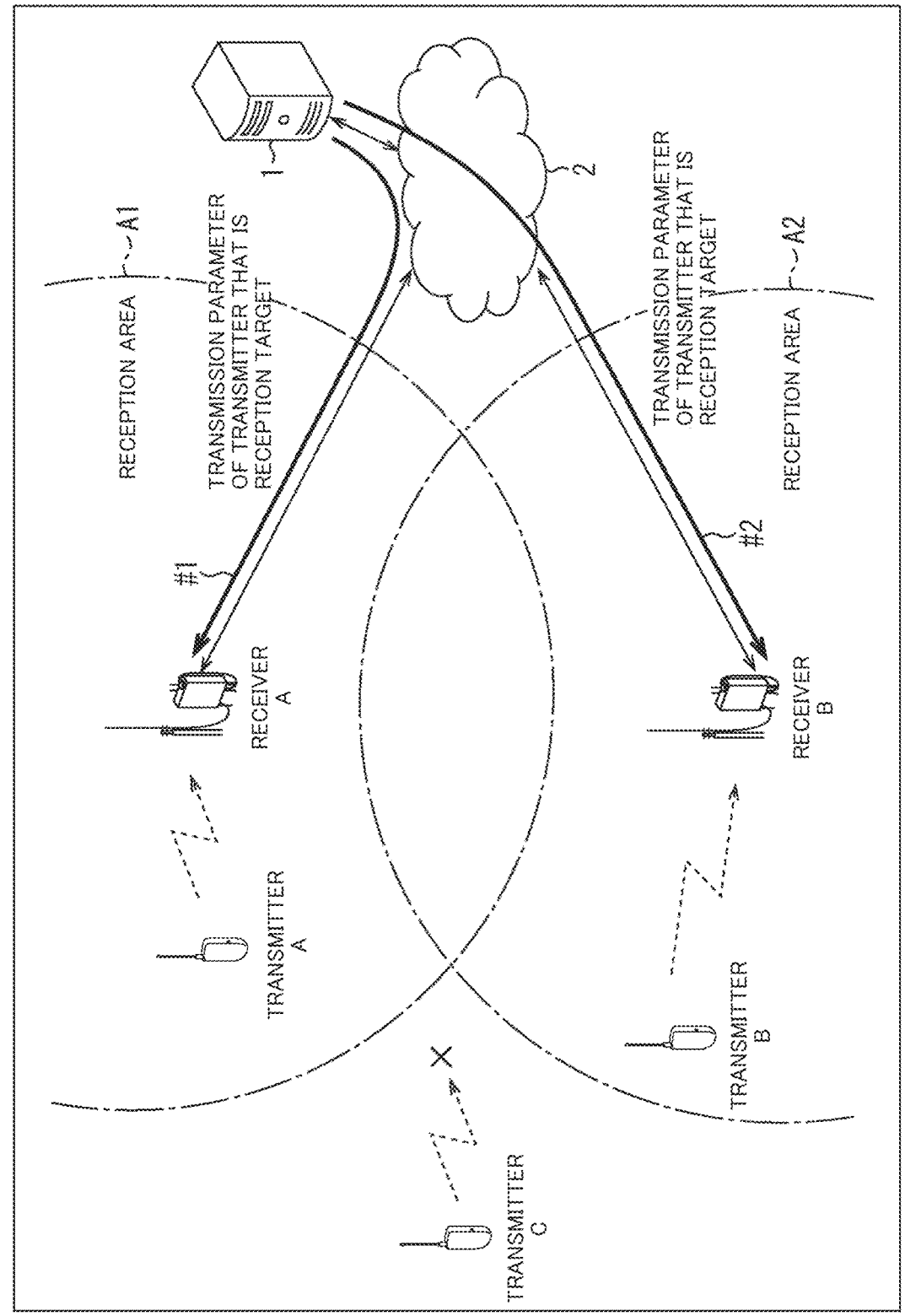
FIG. 3 is a diagram showing an example of registration of transmission parameters.

FIG. 3 is a diagram showing an example of registration of transmission parameters.

The cloud server 1 registers the transmission parameter of the transmitter A that is a reception target of the receiver A with the receiver A, as represented by arrow #1, and registers the transmission parameter of the transmitter B that is a reception target of the receiver B with the receiver B, as represented by arrow #2.

The receiver A can receive data transmitted from the transmitter A by performing setting using the transmission parameter of the transmitter A transmitted from the cloud server 1. In addition, the receiver B can receive data transmitted from the transmitter B by performing setting using the transmission parameter of the transmitter B transmitted from the cloud server 1.

In this manner, in the communication system of FIG. 1, the cloud server 1 performs processing of registering a transmission parameter of a transmitter that is a reception target with each receiver before reception of data because data transmission of a transmitter is performed through unidirectional communication.

Here, at the timing of FIG. 1, it is sufficient for the receiver A to ascertain (register) only the transmission parameter of the transmitter A present in the reception area A1 that is a reception area managed by the receiver A. The receiver A need not know the transmission parameters of the transmitters B and C because data transmitted from the transmitters B and C does not arrive at the receiver A.

In the same manner, it is enough for the receiver B to know only the transmission parameter of the transmitter B present in the reception area A2 that is a reception area managed by the receiver B. The receiver B need not know the transmission parameters of the transmitters B and C because data transmitted from the transmitters B and C do not arrive at the receiver B.

To prevent unnecessary transmission parameter reception processing from occurring, it is also desirable that the cloud server 1 register only transmission parameters necessary for each receiver.

Accordingly, in the communication system of FIG. 1, each transmitter is configured to repeatedly transmit a control frame that is information for notifying a receiver that the transmitter is present in the reception area of the receiver at predetermined intervals.

FIG. 4 is a diagram showing a configuration example of the control frame.

As shown in FIG. 4, the control frame is configured by adding a synchronization signal to a device ID. The control frame also includes 0 padding as a region padded with 0-bit data in order to adapt a frame configuration to a data frame.

Transmission of the control frame having this frame format is performed using transmission parameters that are common in all transmitters. The common transmission parameters include, for example, a common time division multiplexing parameter, a common frequency division multiplexing parameter, and common synchronization pattern information.

The control frame is multiplexed according to a multiplexing method represented by the common time division multiplexing parameter and the common frequency division multiplexing parameter, added with a synchronization signal of a pattern represented by the common synchronization pattern information, and transmitted like position information and the like.

Transmission of the control frame for 1 second every 10 seconds, for example, is designated by the common time division multiplexing parameter.

In addition, transmission of the control frame using all channels for 1 second, for example, is designated by the common frequency division multiplexing parameter.

Transmission of the control frame added with a synchronization signal acquired by randomly selecting one pattern from four patterns determined in advance, for example, is designated by the common synchronization pattern information.

When the control frame can be received by using the same communication method (frequency band and modulation method) as that for a data frame as a control frame transmission method, it is guaranteed that the data frame can be received. Here, the data frame is a frame including a payload in which any transmitted data that a transmitter wants to transmit to a receiver is stored.

All receivers have information on the common transmission parameters. Each receiver can receive any control frame transmitted from a transmitter by performing setting using the common transmission parameters if the transmitter is present in the reception area thereof.

That is, the transmission parameters includes a common parameter used to transmit a control frame, and a non-common parameter (individual) parameter used to transmit a data frame including transmitted data such as position information.

Hereinafter, the transmission parameter used to transmit a control frame is referred to as a system common parameter in the sense that it is a transmission parameter common in all transmitters of the communication system. In addition, the transmission parameter used to transmit a data frame including transmitted data is referred to as an individual parameter.

When each receiver has received a control frame transmitted from a predetermined transmitter by performing control frame reception processing using the system common parameter, each receiver acquires the individual parameter from the cloud server 1 on the basis of a device ID included in the control frame.

Control frame reception processing performed by a receiver may be performed in parallel with data frame reception processing using the individual parameter or performed at a timing determined in the communication system.

Figure 5:
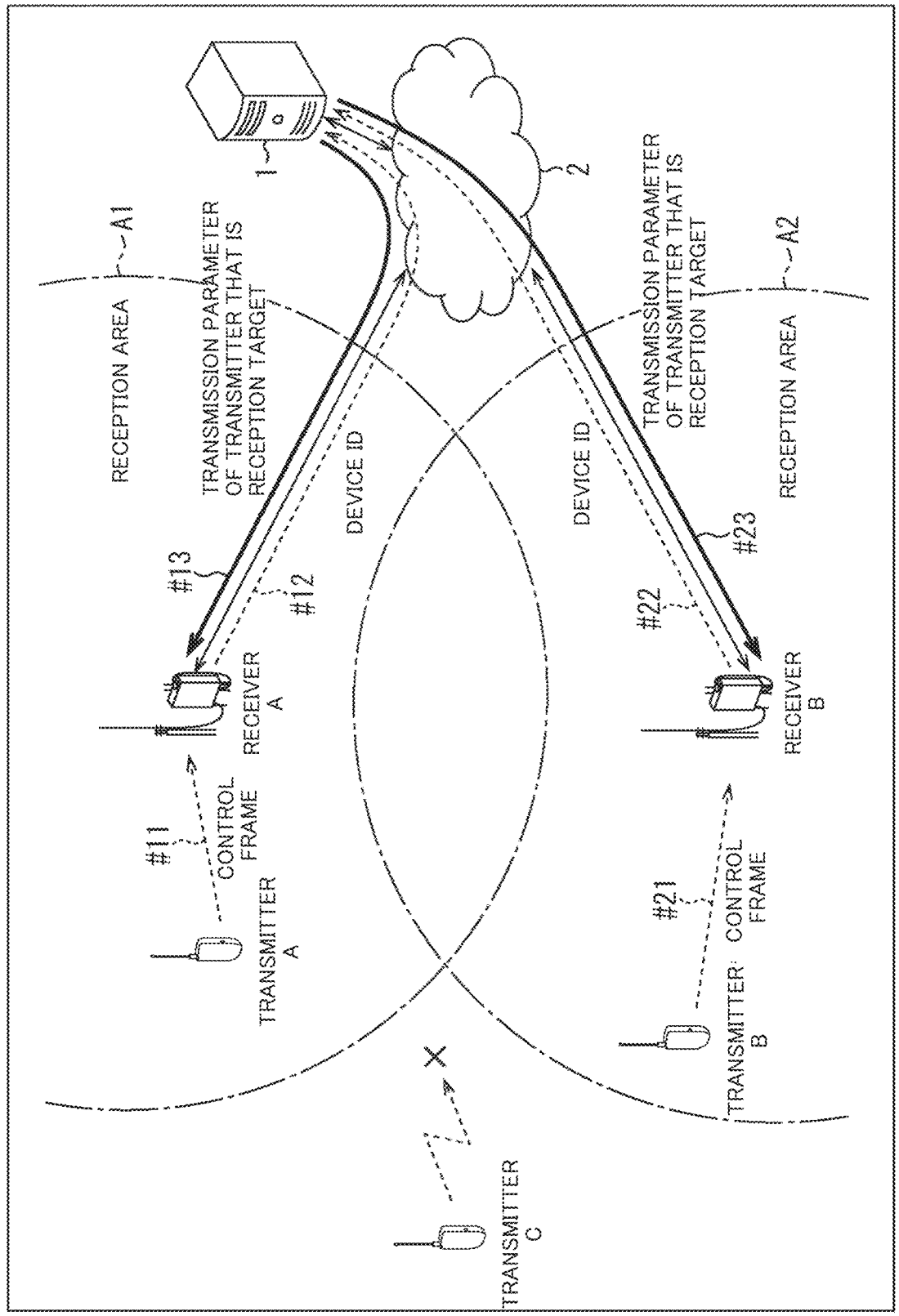
FIG. 5 is a diagram showing an example of registration of transmission parameters.

FIG. 5 is a diagram showing an example of registration of transmission parameters.

The transmitter A transmits a control frame including the device ID thereof using the system common parameter, as indicated by arrow #11.

When the control frame transmitted by the transmitter A has been received using the system common parameter, the receiver A transmits the device ID included in the control frame to the cloud server 1 through the Internet 2, as indicated by arrow #12.

The cloud server 1 acquires an individual parameter of the transmitter A managed in association with the device ID transmitted from the receiver A and transmits the individual parameter to the receiver A through the Internet 2, as indicated by arrow #13.

In the receiver A which has received the individual parameter of the transmitter A transmitted from the cloud server 1, setting using the individual parameter are performed. Accordingly, the receiver A enters a state in which it can receive a data frame transmitted from the transmitter A.

The same processing is also performed in the reception area A2. That is, the transmitter B transmits a control frame including the device ID thereof using the system common parameter, as indicated by arrow #21.

When the control frame transmitted by the transmitter B has been received using the system common parameter, the receiver B transmits the device ID included in the control frame to the cloud server 1 through the Internet 2, as indicated by arrow #22.

The cloud server 1 acquires an individual parameter of the transmitter B managed in association with the device ID transmitted from the receiver B and transmits the individual parameter to the receiver B through the Internet 2, as indicated by arrow #23.

In the receiver B which has received the individual parameter of the transmitter B transmitted from the cloud server 1, setting using the individual parameter is performed. Accordingly, the receiver B enters a state in which it can receive a data frame transmitted from the transmitter B.

In this manner, a transmitter can cause a receiver to receive the device ID thereof and notify the receiver that the transmitter is present in the reception area of the receiver by using the system common parameter.

In addition, a receiver can ascertain the presence of a transmitter and acquire only the individual parameter of the transmitter present in the reception area managed thereby from the cloud server 1. The receiver can perform reception processing only for the transmitter present in the reception area managed thereby by using the individual parameter acquired from the cloud server 1.

Since the cloud server 1 can provide only an individual parameter sufficient for each receiver, it is possible to curb unnecessary transmission and reception of an individual parameter.

Since information transmitted using a control frame is a device ID, and individual parameters are acquired on the basis of the device ID, processing for registering individual parameters having a larger amount of data than the device ID can be realized by a communication method with a low bit rate. Although the individual parameter can also be transmitted from each transmitter using a control frame, in this case, the amount of data is larger as compared to a case in which only the device ID is transmitted, and thus it is difficult to perform processing according to a communication method with a low bit rate.

Meanwhile, the number of system common parameters is not limited to 1. In a case where a plurality of system common parameters have been provided in advance, control frame reception processing is performed by switching the system common parameters, for example.

Further, control frame reception processing using the plurality of system common parameters may be performed in parallel in respective receivers. In this case, system common parameters that can be processed by the receivers are allocated from a parameter space and used for control frame reception processing.

It is possible to reduce communication collision between control frames by performing control frame reception processing using the plurality of system common parameters.

A series of processes in the communication system of FIG. 1 will be described later with reference to a flowchart.

<Example of Communication Method>

Here, a communication method of LPWA communication performed between a transmitter and a receiver will be described. The communication method described here is disclosed in detail in the aforementioned PTL 1.

Figure 6:
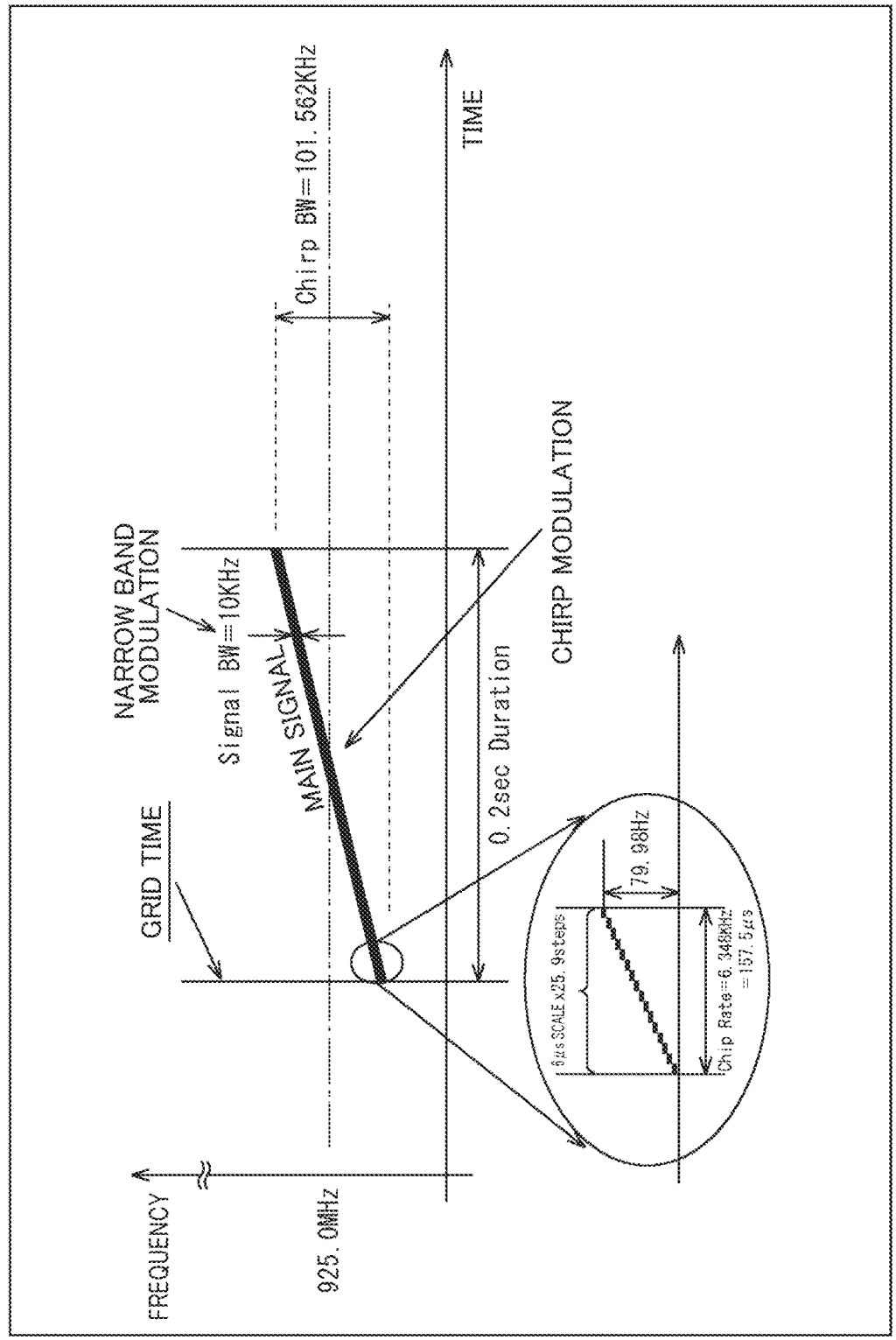
FIG. 6 is a diagram showing an example of chirp modulation.

FIG. 6 is a diagram showing an example of chirp modulation.

Chirp modulation is used for LPWA communication between a transmitter and a receiver. The horizontal axis of FIG. 6 represents time and the vertical axis represents frequency.

As described above, communication between a transmitter and a receiver is performed using 920 MHz band. A plurality of channels with a predetermined frequency bandwidth are set in 920 MHz band.

A main signal shown in FIG. 6 is a transmitted signal after chirp modulation. The center frequency of the main signal is 925 MHz and time is 0.2 seconds. Further, the chirp bandwidth (BW) of the main signal is 101.562 KHz. More specifically, the chirp rate of the main signal is 6.348 KHz. In a case where variation of 79.98 Hz is realized at 25.9 steps with a scale of 6 μs, a time of 157.7 μs is taken.

Figure 7:
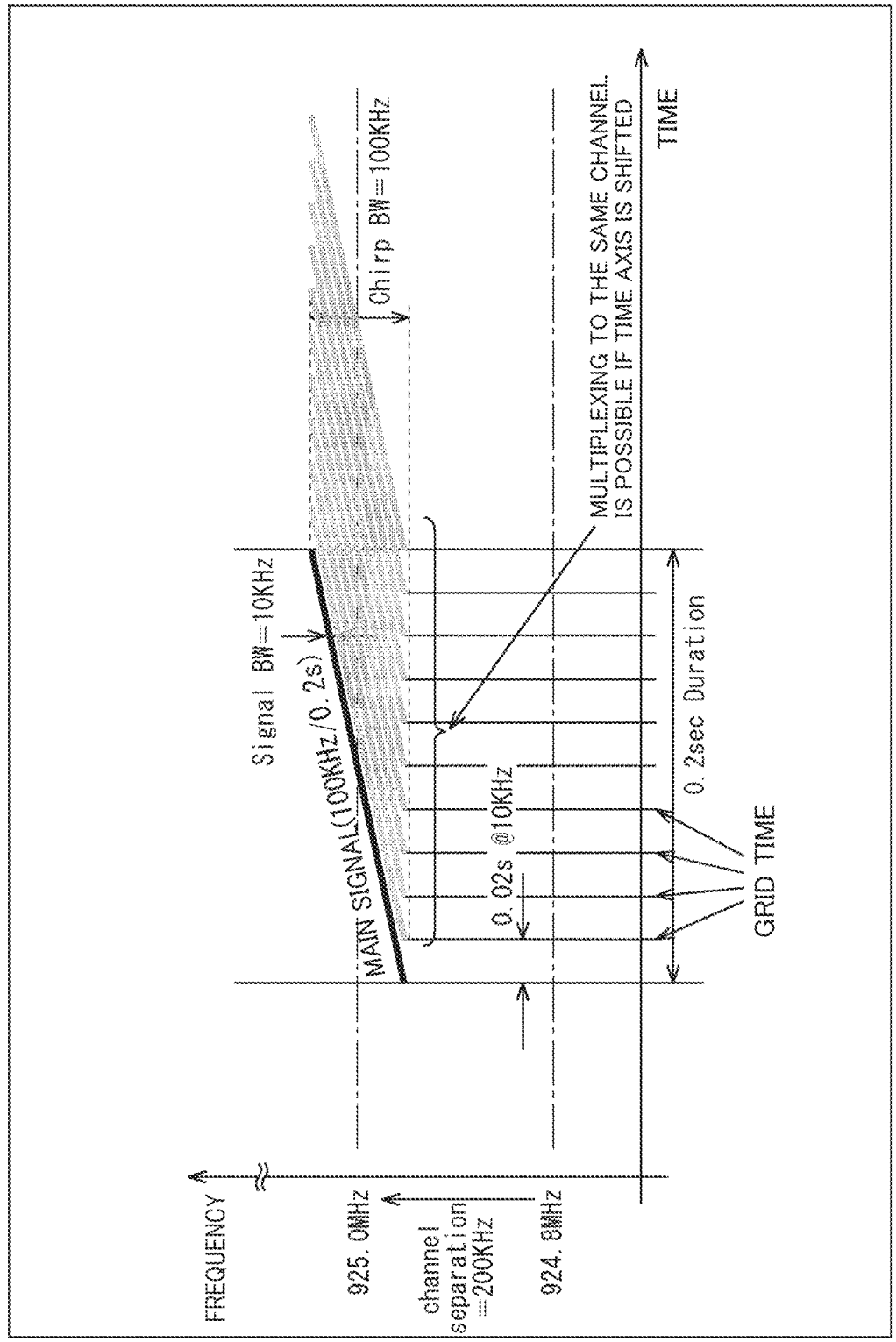
FIG. 7 is a diagram showing an example of multiplexing of a transmitted signal.

A plurality of chirp-modulated transmitted signals are multiplexed in the same channel by shifting respective transmission timings in the direction of time, as shown in FIG. 7.

Transmission of each chirp-modulated transmitted signal is initiated at a known timing. A grid time shown in FIG. 7 represents a transmission timing of each transmitted signal.

A channel used to transmit a control frame and a data frame is designated, for example, by a frequency division multiplexing parameter included in a transmission parameter. In addition, a transmission timing of each chirp-modulated transmitted signal is designated, for example, by a time division multiplexing parameter.

As shown in FIG. 6, narrow band modulation is additionally performed on the chirp-modulated transmitted signal. It is possible to reduce the bandwidth of the main signal to be lower than 10 KHz by using narrow band modulation. Phase shift modulation such as binary phase shift keying (BPSK) and quadrature phase shift keying (QPSK) is used as narrow band modulation. Minimum-shifting keying such as Gaussian filtered minimum shifting keying (GMSK) may be used.

Various communication methods can be employed as a communication method of LPWA communication performed between a transmitter and a receiver in addition to the communication method using chirp modulation.

<Configuration Example of Each Device>

Configuration of Transmitter

Figure 8:
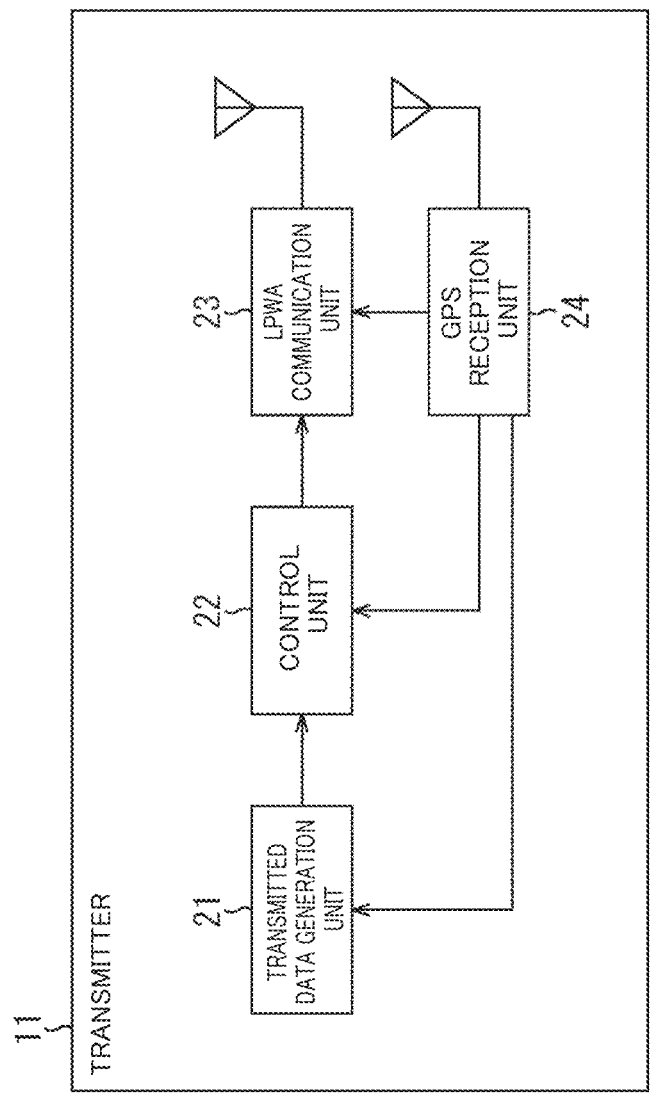
FIG. 8 is a block diagram showing a configuration example of a transmitter.

FIG. 8 is a block diagram showing a configuration example of a transmitter.

As shown in FIG. 8, a transmitter 11 includes a transmitted data generation unit 21, a control unit 22, an LPWA communication unit 23, and a GPS reception unit 24.

The transmitted data generation unit 21 generates transmitted data to be transmitted to a receiver. In a case where position information is transmitted, for example, the transmitted data generation unit 21 generates transmitted data including the position information supplied from the GPS reception unit 24.

Various types of data such as images, audio, temperature, an acceleration, an angular velocity, and an illuminance may be transmitted in addition to position information. In this case, the transmitted data generation unit 21 acquires this data detected by sensors provided in the transmitter 11 and generates transmitted data. The transmitted data generated by the transmitted data generation unit 21 is output to the control unit 22.

The control unit 22 is composed of a central processing unit (CPU), a read only memory (ROM), a random access memory (RAM), and the like. The control unit 22 controls overall operation of the transmitter 11 by executing a predetermined program through the CPU.

The control unit 22 generates a control frame and a data frame and outputs them to the LPWA communication unit 23. Further, the control unit 22 outputs a transmission parameter to the LPWA communication unit 23 and sets the transmission parameter as a parameter used to transmit data.

The LPWA communication unit 23 transmits a control frame and a data frame using the transmission parameter supplied from the control unit 22.

The GPS reception unit 24 receives a GPS signal and outputs time information included in the GPS signal to the control unit 22. In addition, the GPS reception unit 24 outputs a 1 pulse per second (PPS) signal acquired by processing the GPS signal to the LPWA communication unit 23. Synchronization of time with a receiver is established by the signal output from the GPS reception unit 24.

Further, the GPS reception unit 24 performs positioning by receiving the GPS signal and outputs position information of the transmitter 11 to the transmitted data generation unit 21.

Figure 9:
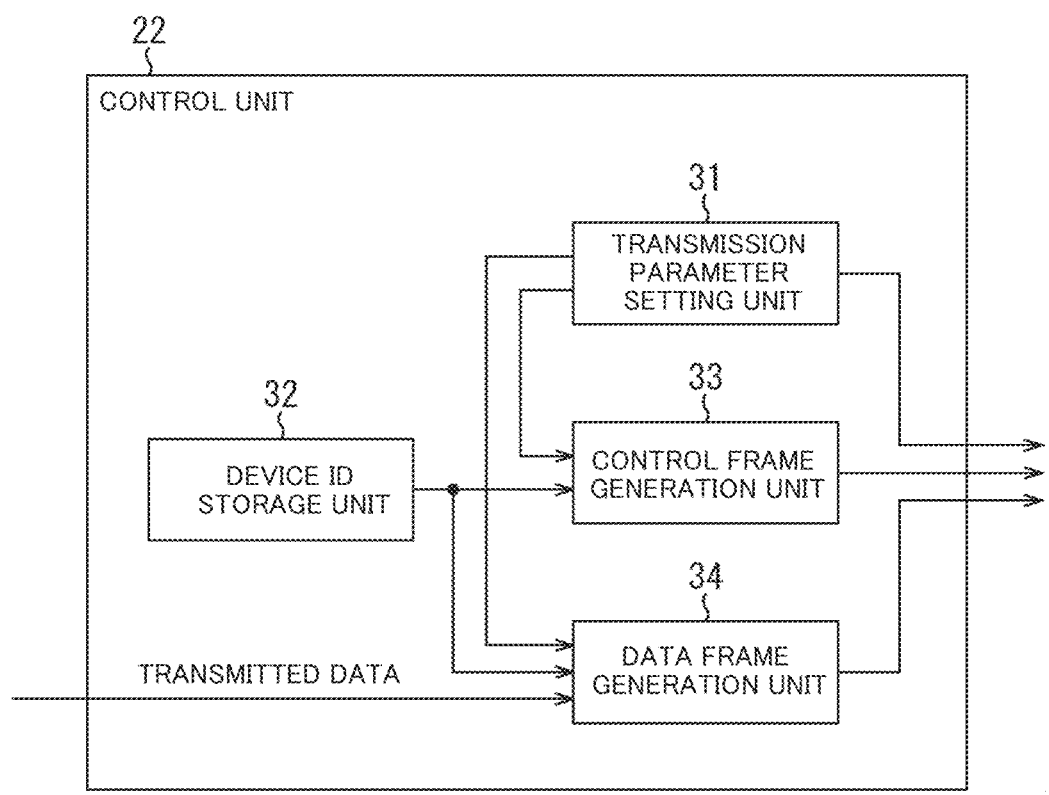
FIG. 9 is a block diagram showing a functional configuration example of a control unit of FIG. 8.

FIG. 9 is a block diagram showing a functional configuration example of the control unit 22 of FIG. 8.

As shown in FIG. 9, in the control unit 22, a transmission parameter setting unit 31, a device ID storage unit 32, a control frame generation unit 33, and a data frame generation unit 34 are realized. At least some of these functional units are realized by the CPU of the control unit 22 executing a predetermined program.

The transmission parameter setting unit 31 sets a transmission parameter in the LPWA communication unit 23, the control frame generation unit 33, and the data frame generation unit 34.

For example, the transmission parameter setting unit 31 sets a common time division multiplexing parameter and a common frequency division multiplexing parameter included in a system common parameter in the LPWA communication unit 23 and sets common synchronization pattern information in the control frame generation unit 33 when a control frame is transmitted.

In addition, the transmission parameter setting unit 31 sets a time division multiplexing parameter and a frequency division multiplexing parameter included in an individual parameter in the LPWA communication unit 23 and sets synchronization pattern information in the data frame generation unit 34 when a data frame is transmitted.

Information on the system common parameter and the individual parameter information are set in the transmission parameter setting unit 31 in advance. Setting of a transmission parameter by the transmission parameter setting unit 31 is performed, for example, with reference to time information supplied from the GPS reception unit 24.

The device ID storage unit 32 stores a device ID that is identification information of the transmitter 11. The device ID storage unit 32 outputs the device ID to the control frame generation unit 33 when a control frame is transmitted. The device ID stored in the device ID storage unit 32 is appropriately supplied to the data frame generation unit 34 and included in a data frame.

The control frame generation unit 33 adds a synchronization signal of a pattern represented by the common synchronization pattern information to the device ID and generates a control frame when the control frame is transmitted. The control frame generation unit 33 outputs the generated control frame to the LPWA communication unit 23.

The data frame generation unit 34 adds a synchronization signal to transmitted data supplied from the transmitted data generation unit 21 and generates a data frame. The synchronization signal included in the data frame is a synchronization signal of a pattern represented by synchronization pattern information included in the individual parameter. The data frame generation unit 34 outputs the generated data frame to the LPWA communication unit 23.

Figure 10:
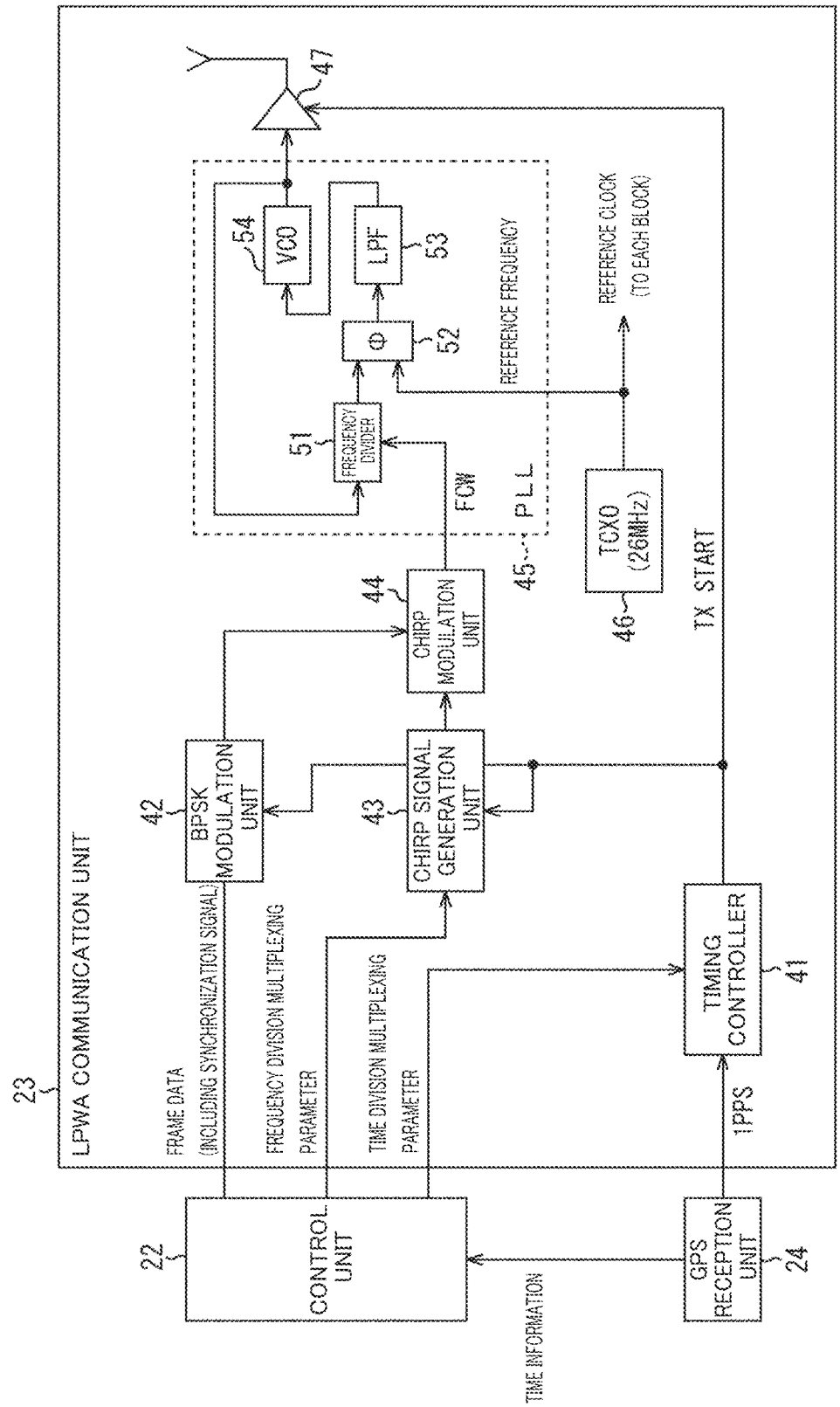
FIG. 10 is a block diagram showing a configuration example of an LPWA communication unit of FIG. 8.

FIG. 10 is a block diagram showing a configuration example of the LPWA communication unit 23 of FIG. 8.

As shown in FIG. 10, the LPWA communication unit 23 includes a timing controller 41, a BPSK modulation unit 42, a chirp signal generation unit 43, a chirp modulation unit 44, a PLL 45, a reference clock generation unit (TCXO) 46, and an amplification unit 47.

The time division multiplexing parameter output from the control unit 22 is input to the timing controller 41 and the frequency division multiplexing parameter is input to the chirp signal generation unit 43. For example, a transmission timing of data is designated by the time division multiplexing parameter output from the control unit 22. In addition, a channel used to transmit data, for example, is designated by the frequency division multiplexing parameter. The inclination of a chirp signal, and the like may be designated by the frequency division multiplexing parameter. Data of the control frame and the data frame output from the control unit 22 is input to the BPSK modulation unit 42.

The timing controller 41 controls processing timings in the BPSK modulation unit 42, the chirp signal generation unit 43, and the amplification unit 47 on the basis of the time division multiplexing parameter supplied from the control unit 22.

Transmission timings of the control frame and the data frame are controlled according to the time division multiplexing parameter through processing performed by the timing controller 41. Timing control by the timing controller 41 is performed on the basis of the 1PPS signal supplied from the GPS reception unit 24.

The BPSK modulation unit 42 performs BPSK modulation on frame data supplied from the control unit 22 and outputs the BPSK-modulated frame data to the chirp modulation unit 44.

The chirp signal generation unit 43 generates a chirp signal on the basis of the frequency division multiplexing parameter supplied from the control unit 22 and outputs the chirp signal to the chirp modulation unit 44. A channel used to transmit a control frame and a data frame, and the like are controlled according to the frequency division multiplexing parameter through processing performed by the chirp signal generation unit 43.

The chirp modulation unit 44 modulates (chirp modulates) the frame data supplied from the BPSK modulation unit 42 using the chirp signal supplied from the chirp signal generation unit 43. The chirp modulation unit 44 outputs the chirp-modulated frame data to the PLL 45.

The PLL 45 generates a transmitted signal of a predetermined frequency in response to the frame data supplied from the chirp modulation unit 44 and outputs the transmitted signal to the amplification unit 47. As shown in FIG. 10, the PLL 45 includes a frequency divider 51, a phase comparator 52, an LPF 53, and a VCO 54. For example, a reference clock signal of 26 MHz generated by the reference clock signal generation unit 46 is input to the phase comparator 52.

The amplification unit 47 amplifies the transmitted signal supplied from the PLL 45 and transmits the amplified signal through an antenna.

Configuration of Receiver

Figure 11:
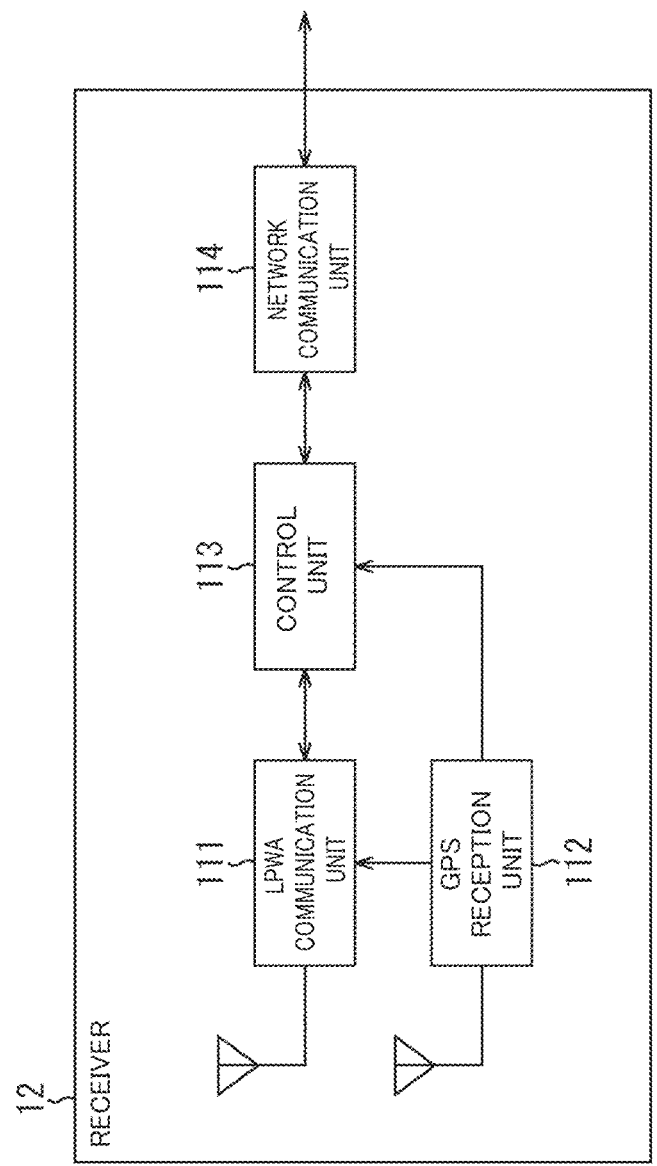
FIG. 11 is a block diagram showing a configuration example of a receiver.

FIG. 11 is a block diagram showing a configuration example of a receiver.

As shown in FIG. 11, a receiver 12 includes an LPWA communication unit 111, a GPS reception unit 112, a control unit 113, and a network communication unit 114.

The LPWA communication unit 111 receives a control frame and a data frame transmitted from the transmitter 11 using a transmission parameter supplied from the control unit 113. The LPWA communication unit 111 outputs the received control frame and data frame to the control unit 113.

The GPS reception unit 112 receives a GPS signal and outputs time information included in the GPS signal to the control unit 113. In addition, the GPS reception unit 24 outputs a 1PPS signal acquired by processing the GPS signal to the LPWA communication unit 111. Synchronization of time with a transmitter is established according to the signal output from the GPS reception unit 112.

The control unit 113 is composed of a CPU, a ROM, a RAM, and the like. The control unit 113 executes a predetermined program through the CPU to control overall operation of the receiver 12.

The control unit 113 outputs the transmission parameter to the LPWA communication unit 111 and sets it as a parameter used to receive data. In addition, the control unit 113 acquires a device ID by analyzing the control frame supplied from the LPWA communication unit 111 and acquires transmitted data by analyzing the data frame. The device ID and the transmitted data acquired by the control unit 113 is supplied to the network communication unit 114.

The network communication unit 114 is an interface of the Internet 2. The network communication unit 114 performs communication with respective devices connected to the Internet 2 which include the cloud server 1.

For example, the network communication unit 114 transmits the device ID supplied from the control unit 113 to the cloud server 1. The network communication unit 114 receives an individual parameter transmitted from the cloud server 1 in response to transmission of the device ID. The individual parameter transmitted from the cloud server 1 is a transmission parameter used to receive data transmitted from a transmitter present in the reception area managed by the receiver 12. The network communication unit 114 outputs the individual parameter transmitted from the cloud server 1 to the control unit 113.

Further, the network communication unit 114 transmits transmitted data such as position information supplied from the control unit 113 to a predetermined server through the Internet 2.

Figure 12:
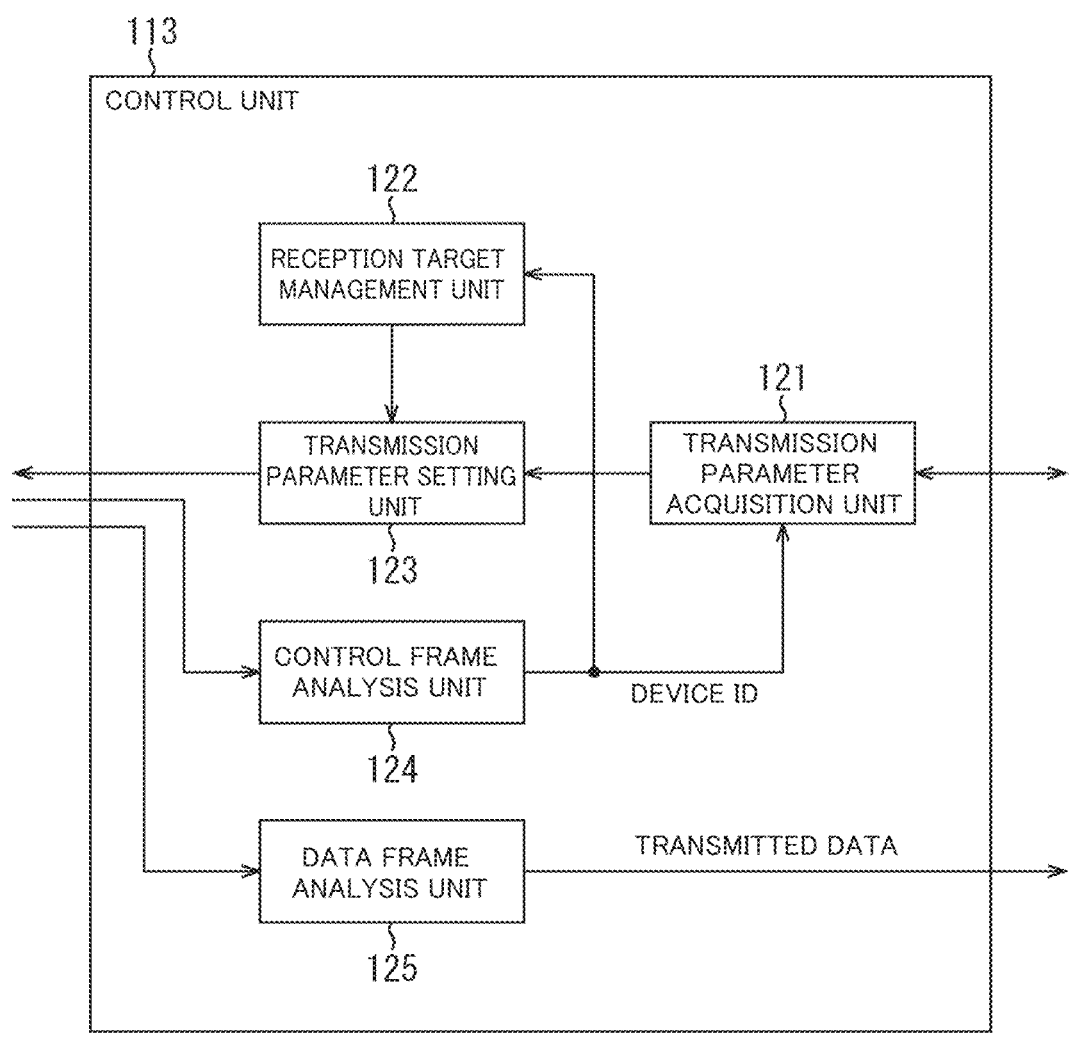
FIG. 12 is a block diagram showing a functional configuration example of a control unit of FIG. 11.

FIG. 12 is a block diagram showing a functional configuration example of the control unit 113 of FIG. 11.

As shown in FIG. 12, in the control unit 113, a transmission parameter acquisition unit 121, a reception target management unit 122, a transmission parameter setting unit 123, a control frame analysis unit 124, and a data frame analysis unit 125 are realized. At least some of these functional units are realized by the CPU of the control unit 113 executing a predetermined program.

The transmission parameter acquisition unit 121 outputs a device ID supplied from the control frame analysis unit 124 to the network communication unit 114 and causes the network communication unit 114 to transmit the device ID to the cloud server 1. The transmission parameter acquisition unit 121 acquires an individual parameter transmitted from the cloud server 1 and received by the network communication unit 114 and outputs the individual parameter to the transmission parameter setting unit 123.

The reception target management unit 122 manages the device ID supplied from the control frame analysis unit 124 as a device ID of a transmitter that is a reception target. The device ID managed by the reception target management unit 122 is appropriately supplied to the transmission parameter setting unit 123.

The transmission parameter setting unit 123 sets a transmission parameter in the LPWA communication unit 111. The transmission parameter setting unit 123 sets a system common parameter when a control frame is received and sets the individual parameter acquired by the transmission parameter acquisition unit 121 when a data frame is received.

Information on the system common parameter is set in advance in the transmission parameter setting unit 123. Setting of a transmission parameter by the transmission parameter setting unit 123 is performed, for example, with reference to time information supplied from the GPS reception unit 112.

The control frame analysis unit 124 analyzes a control frame supplied from the LPWA communication unit 111 and acquires a device ID. The control frame analysis unit 124 outputs the device ID acquired from the control frame to the transmission parameter acquisition unit 121 and the reception target management unit 122.

The data frame analysis unit 125 analyzes a data frame supplied from the LPWA communication unit 111 and acquires transmitted data stored in the data frame. The transmitted data acquired by the data frame analysis unit 125 is output to the network communication unit 114 and transmitted to a predetermined server through the Internet 2.

Figure 13:
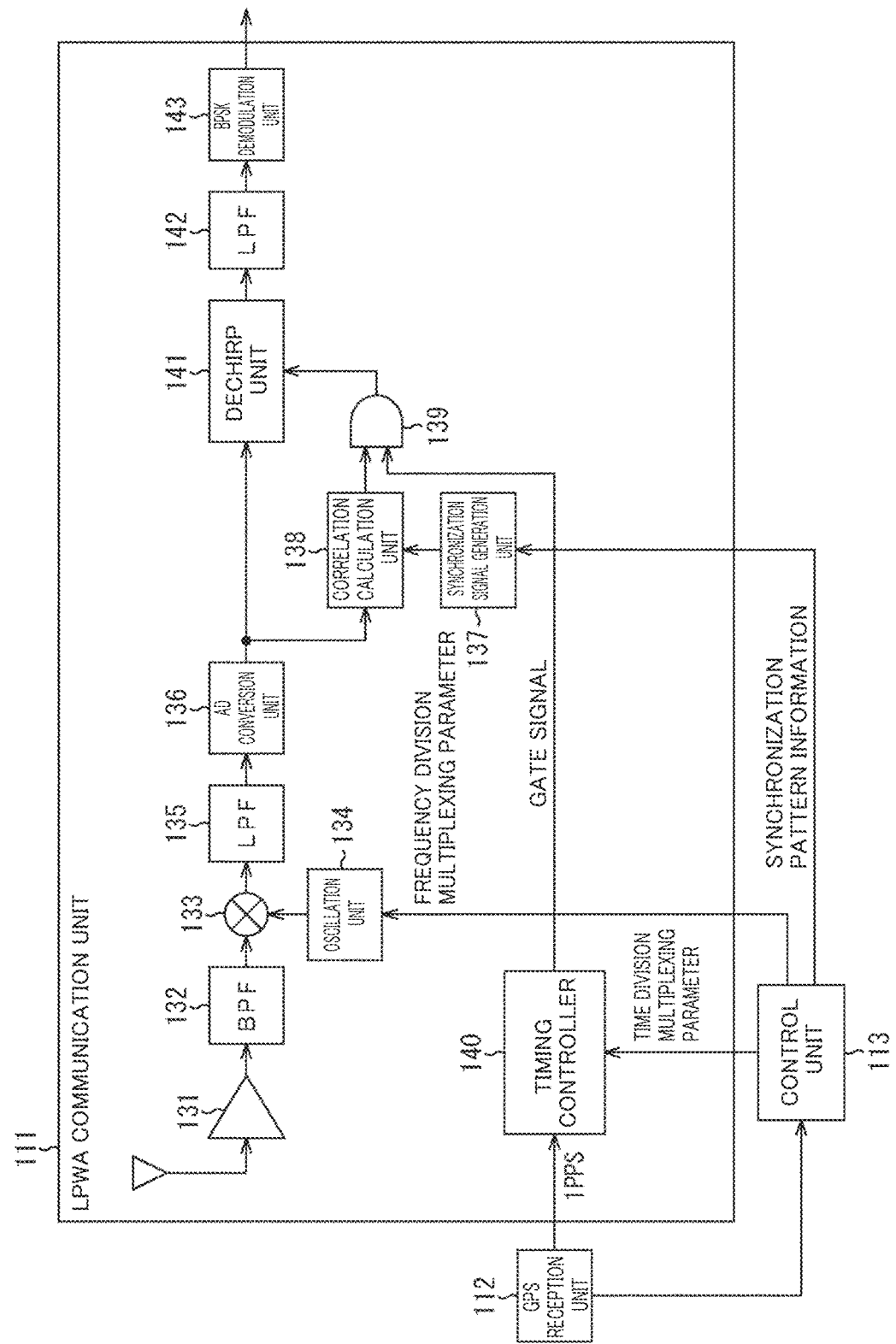
FIG. 13 is a block diagram showing a configuration example of an LPWA communication unit of FIG. 11.

FIG. 13 is a block diagram showing a configuration example of the LPWA communication unit 111 of FIG. 11.

As shown in FIG. 13, the LPWA communication unit 111 includes an amplification unit 131, a band pass filter (BPF) 132, a multiplication unit 133, an oscillation unit 134, a low pass filter (LPF) 135, an AD conversion unit 136, and a synchronization signal generation unit 137. In addition, the LPWA communication unit 111 includes a correlation calculation unit 138, an AND gate 139, a timing controller 140, a dechirp unit 141, an LPF 142, and a BPSK demodulation unit 143.

A time division multiplexing parameter output from the control unit 113 is input to the timing controller 140 and a frequency division multiplexing parameter is input to the oscillation unit 134. For example, a data reception timing is designated by the time division multiplexing parameter output from the control unit 113. Further, a channel used to receive data, for example, is designated by the frequency division multiplexing parameter. Synchronization pattern information output from the control unit 113 is input to the synchronization signal generation unit 137.

The amplification unit 131 amplifies a received signal supplied from an antenna and outputs the amplified signal to the BPF 132.

The BPF 132 eliminates a predetermined frequency component from the received signal and outputs the received signal from which the predetermined frequency component has been eliminated to the multiplication unit 133.

The oscillation unit 134 oscillates according to the frequency division multiplexing parameter supplied from the control unit 113 and generates a carrier signal of a predetermined frequency used for transmission and reception. The oscillation unit 134 supplies the carrier signal of the predetermined frequency to the multiplication unit 133.

The multiplication unit 133 multiplies the received signal supplied from the BPF 132 by the carrier signal supplied from the oscillation unit 134 and supplies the received signal that is the multiplication result to the LPF 135.

The LPF 135 eliminates a high-frequency component of the received signal supplied from the multiplication unit 133 and outputs the received signal from which the high-frequency component has been eliminated to the AD conversion unit 136.

The AD conversion unit 136 performs AD conversion of the received signal supplied from the LPF 135 and outputs a digital received signal obtained by performing AD conversion to the correlation calculation unit 138 and the dechirp unit 141.

The synchronization signal generation unit 137 generates a synchronization signal of a pattern designated by the synchronization pattern information supplied from the control unit 113 and outputs the synchronization signal to the correlation calculation unit 138. The synchronization signal generation unit 137 generates a synchronization signal of a pattern represented by common synchronization pattern information when a control frame is received and generates a synchronization signal of a pattern represented by synchronization pattern information included in the individual parameter when a data frame is received.

The correlation calculation unit 138 compares the received signal supplied from the AD conversion unit 136 with the synchronization signal supplied from the synchronization signal generation unit 137 and outputs information representing the comparison result to the AND gate 139. The synchronization signal of the control frame or the synchronization signal of the data frame is detected by the correlation calculation unit 138.

The AND gate 139 supplies the dechirp unit 141 with a control signal for instructing start of demodulation when both a gate signal supplied from the timing controller 140 and information representing the comparison result supplied from the correlation calculation unit 138 are true.

The timing controller 140 generates the gate signal for controlling a demodulation timing on the basis of the time division multiplexing parameter supplied from the control unit 113 and outputs the gate signal to the AND gate 139.

A reception timing of the control frame and the data frame is controlled according to the time division multiplexing parameter through processing of the timing controller 140. Timing control by the timing controller 140 is performed on the basis of the 1PPS signal supplied from the GPS reception unit 112.

The dechirp unit 141 performs dechirping (demodulation of chirp modulation) on the received signal supplied from the AD conversion unit 136 and outputs a demodulated signal acquired by performing dechirping to the LPF 142 in a case where the AND gate 139 instructs start of demodulation.

The LPF 142 eliminates a high-frequency component of the demodulated signal and outputs the demodulated signal from which the high-frequency component has been eliminated to the BPSK demodulation unit 143.

The BPSK demodulation unit 143 performs BPSK demodulation on the demodulated signal supplied from the LPF 142 and outputs frame data of the control frame and the data frame to the control unit 113 as the demodulation result.

Configuration of Cloud Server

Figure 14:
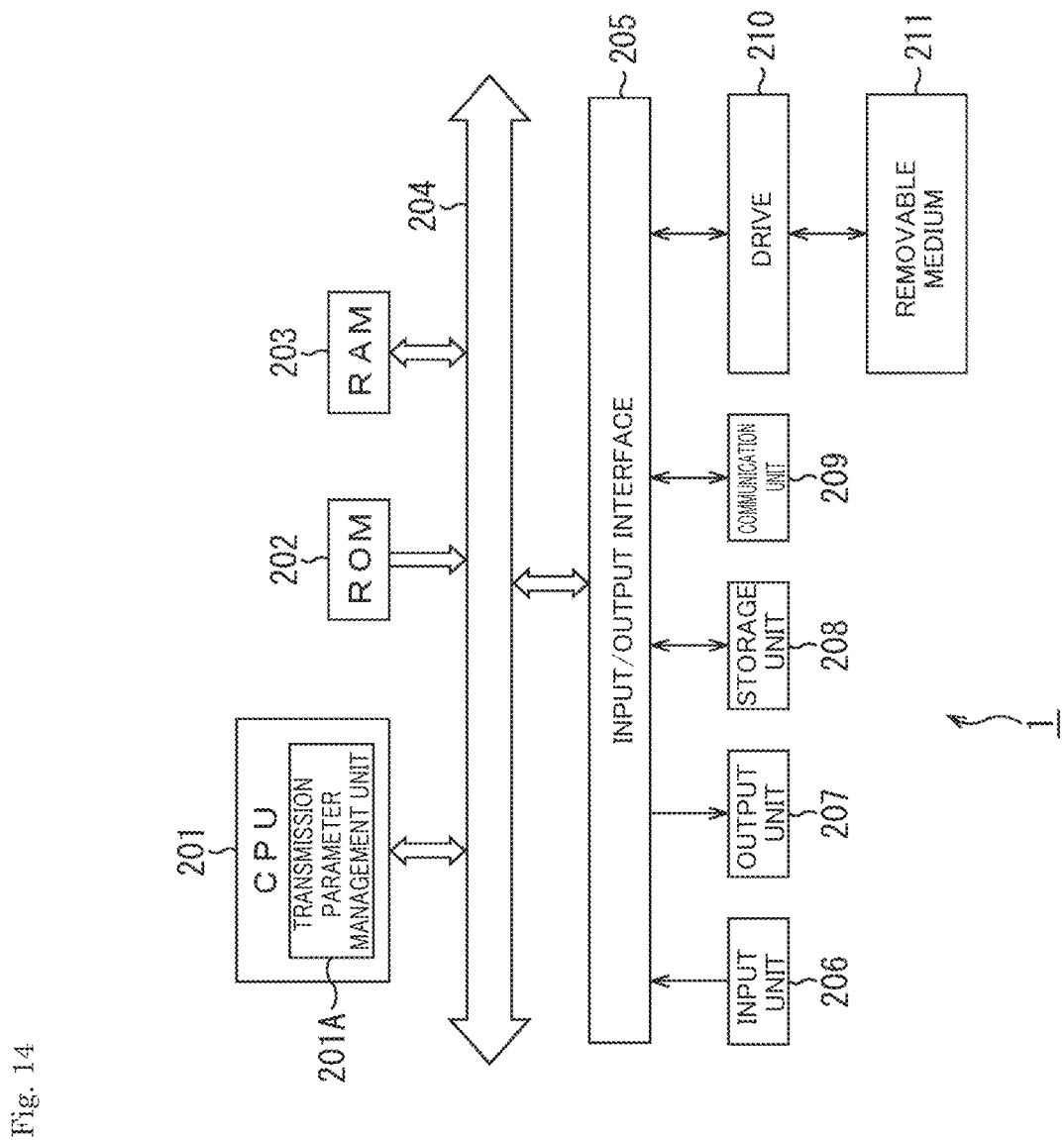
FIG. 14 is a block diagram showing a configuration diagram of a cloud server.

FIG. 14 is a block diagram showing a configuration example of the cloud server 1.

As shown in FIG. 14, the cloud server 1 is composed of a computer. The cloud server 1 may be composed of a single computer or composed of a plurality of computers. In a case where the cloud server 1 is composed of a plurality of computers, these computers perform information processing in cooperation through the Internet 2 and perform registration of a transmission parameter with a receiver, and the like.

A CPU 201, a ROM 202, and a RAM 203 are connected through a bus 204. In the CPU 201, a predetermined program is executed to realize a transmission parameter management unit 201A.

The transmission parameter management unit 201A manages an individual parameter of each transmitter in association with a device ID. The individual parameter of each transmitter is stored in a storage unit 208, for example.

In addition, in a case where a device ID is transmitted from a receiver and received by a communication unit 209, the transmission parameter management unit 201A reads and acquires an individual parameter associated with the received device ID from the storage unit 208. The transmission parameter management unit 201A outputs the individual parameter acquired from the storage unit 208 to the communication unit 209 and causes the communication unit 209 to transmit the individual parameter to the receiver that has transmitted the device ID.

An input/output interface 205 is additionally connected to the bus 204. An input unit 206 including a keyboard, a mouse, and the like, and an output unit 207 including a display, a speaker, and the like are connected to the input/output interface 205. In addition, the storage unit 208 including a hard disk, a non-volatile memory, and the like, the communication unit 209 including a network interface and the like, and a drive 210 that drives a removable medium 211 are connected to the input/output interface 205.

<Operation of Each Device>

Here, the operation of each device having the above-described configuration will be described.

Figure 15:
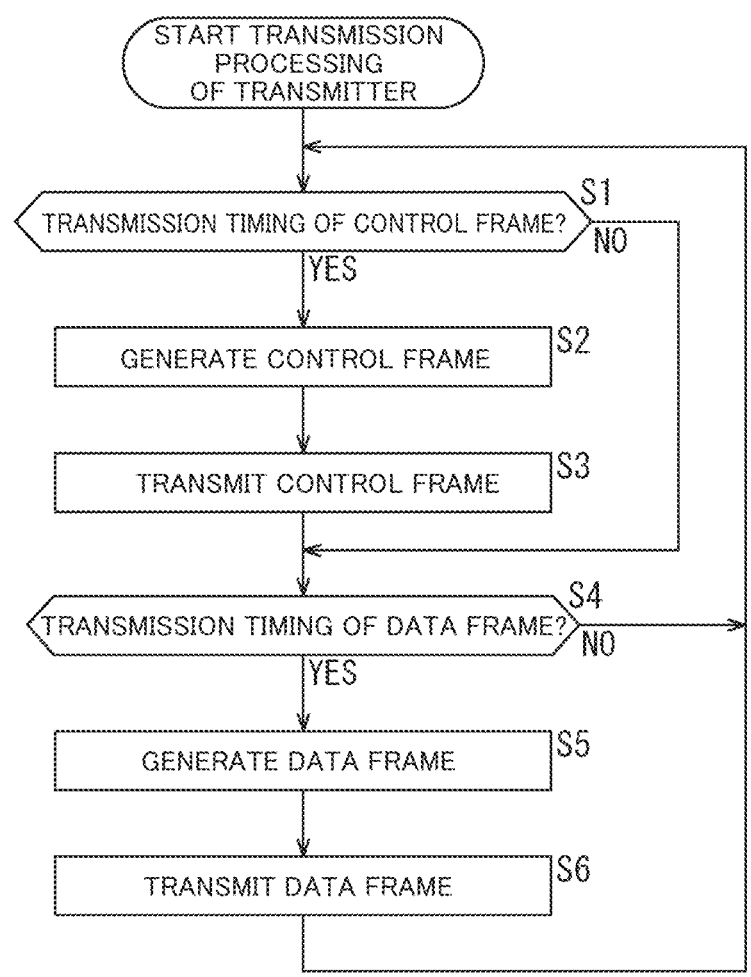
FIG. 15 is a flowchart describing transmission processing of a transmitter.

Operation of Transmitter First, transmission processing of the transmitter 11 will be described with reference to a flowchart of FIG. 15.

In step S1, the transmission parameter setting unit 31 of the control unit 22 determines whether a control frame transmission timing has arrived.

When it is determined that the control frame transmission timing has arrived in step S1, the control frame generation unit 33 generates a control frame in step S2.

When it is determined that the control frame transmission timing has arrived, the transmission parameter setting unit 31 sets a common time division multiplexing parameter and a common frequency division multiplexing parameter included in a system common parameter in the LPWA communication unit 23. In addition, the transmission parameter setting unit 31 sets common synchronization pattern information in the control frame generation unit 33.

The control frame generation unit 33 generates the control frame by adding a synchronization signal of a pattern represented by the common synchronization pattern information set by the transmission parameter setting unit 31 to a device ID.

In step S3, the LPWA communication unit 23 transmits the control frame generated by the control frame generation unit 33. Transmission of the control frame is performed according to the common time division multiplexing parameter and the common frequency division multiplexing parameter included in the system common parameter set by the transmission parameter setting unit 31.

When it is determined that the control frame transmission timing has not arrived in step S1, processing of steps S2 and S3 is skipped.

In step S4, the transmission parameter setting unit 31 determines whether a data frame transmission timing has arrived. Transmitted data such as position information is transmitted, for example, at predetermined intervals.

When it is determined that the data frame transmission timing has arrived in step S4, the data frame generation unit 34 generates a data frame in step S5.

When it is determined that the data frame transmission timing has arrived, the transmission parameter setting unit 31 sets a time division multiplexing parameter and a frequency division multiplexing parameter included in an individual parameter in the LPWA communication unit 23 and sets synchronization pattern information in the data frame generation unit 34. The data frame generation unit 34 generates the data frame by adding a synchronization signal of a pattern represented by synchronization pattern information set by the transmission parameter setting unit 31 to transmitted data.

In step S6, the LPWA communication unit 23 transmits the data frame generated by the data frame generation unit 34. Transmission of the data frame is performed according to the time division multiplexing parameter and the frequency division multiplexing parameter included in the individual parameter set by the transmission parameter setting unit 31.

After the data is transmitted or when it is determined that the data frame transmission timing has not arrived in step S4, processing returns to step S1 and the above-described processing is repeated.

The above-described processing is performed by each transmitter 11.

Accordingly, respective transmitters 11 multiplex control frames through the same multiplexing method as that used for a plurality of other transmitters 11 to transmit control frames thereof and transmit the control frames. Furthermore, respective transmitters 11 add the same synchronization signal as that used for a plurality of other transmitters 11 to transmit control frames thereof to control frames and transmit them.

Although transmission of a control frame is repeated at predetermined intervals in the above description, a control frame transmission interval may be increased with elapse of time from a reference timing on the basis of power on timing of the transmitter 11, for example. Adjustment of the control frame transmission interval is performed, for example, according to control of the control frame generation unit 33.

Accordingly, in a case where the individual parameter of the transmitter has already been registered with the receiver 12, the number of times the control frame is repeatedly transmitted can be reduced. In a case where the control frame transmission interval is not increased and a predetermined time has elapsed from the reference timing, transmission of the control frame after that may be stopped.

Operation of Receiver

Next, processing of the receiver 12 for acquiring an individual parameter will be described with reference to a flowchart of FIG. 16.

In step S21, the transmission parameter setting unit 123 sets a system common parameter in the LPWA communication unit 111. In the LPWA communication unit 111, control frame reception processing is performed according to the system common parameter.

In step S22, the control frame analysis unit 124 determines whether a control frame has been received by the LPWA communication unit 111.

When it is determined that the control frame has been received in step S22, the control frame analysis unit 124 analyzes the control frame supplied from the LPWA communication unit 111 and acquires a device ID in step S23.

In step S24, the network communication unit 114 transmits the device ID acquired by the control frame analysis unit 124 to the cloud server 1. An individual parameter associated with the device ID is transmitted from the cloud server 1.

In step S25, the transmission parameter acquisition unit 121 acquires the individual parameter transmitted from the cloud server 1 and received by the network communication unit 114. The acquired individual parameter is supplied to the transmission parameter setting unit 123 and set in the LPWA communication unit 111.

In step S26, the reception target management unit 122 registers the device ID acquired by the control frame analysis unit 124 as information about a transmitter that is a reception target.

After the information about the transmitter that is the reception target is registered or when it is determined that the control frame has not been received in step S22, processing returns to step S21 and the aforementioned processing is repeated.

Accordingly, respective receivers 12 receive a control frame multiplexed through the same multiplexing method as that used for a plurality of transmitters 11 to transmit control frames and transmitted from a predetermined transmitter 11.

Furthermore, respective receivers 12 receive a control frame added with the same synchronization signal as that used for a plurality of transmitters 11 to transmit control frames and transmitted from a predetermined transmitter 11.

It may be determined whether the device ID included in the control frame has been registered as information about the transmitter that is the reception target.

For example, in a case where the device ID included in the control frame has already been registered, processing of acquiring the individual parameter from the cloud server 1 on the basis of the device ID is not performed. Accordingly, it is possible to prevent processing of acquiring the device ID that has already been registered from the cloud server 1 from being performed.

Next, reception processing of the receiver 12 will be described with reference to a flowchart of FIG. 17.

Figure 16:
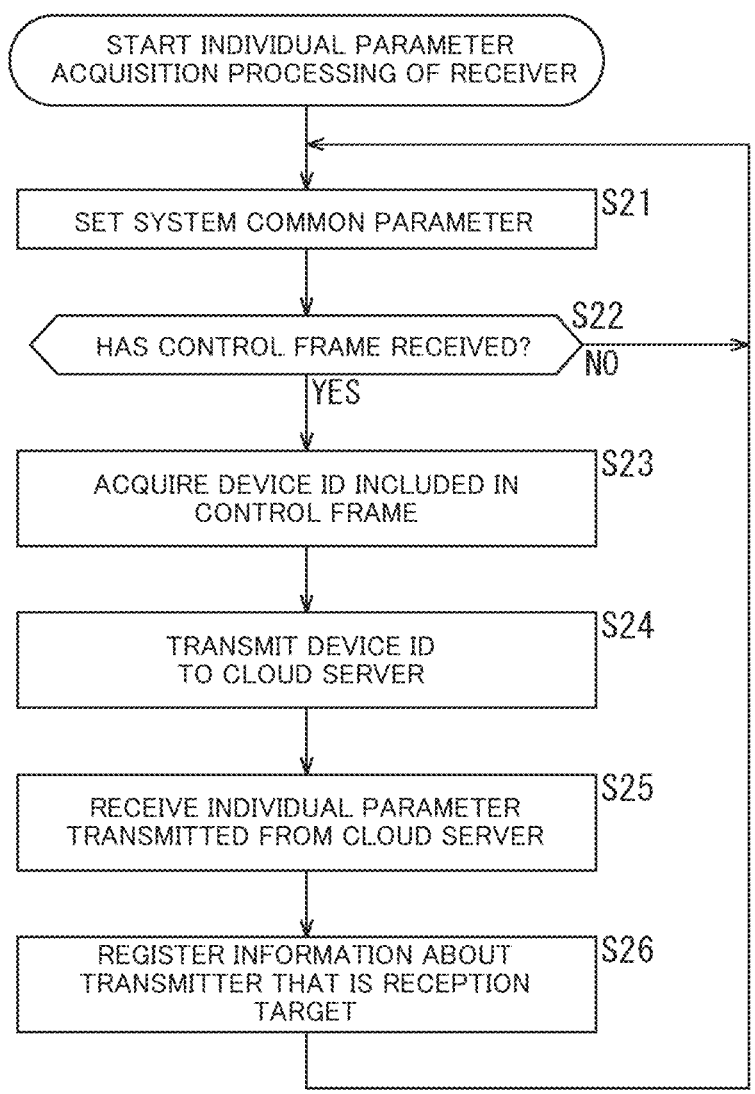
FIG. 16 is a flowchart describing individual parameter acquisition processing of a receiver.
Figure 17:
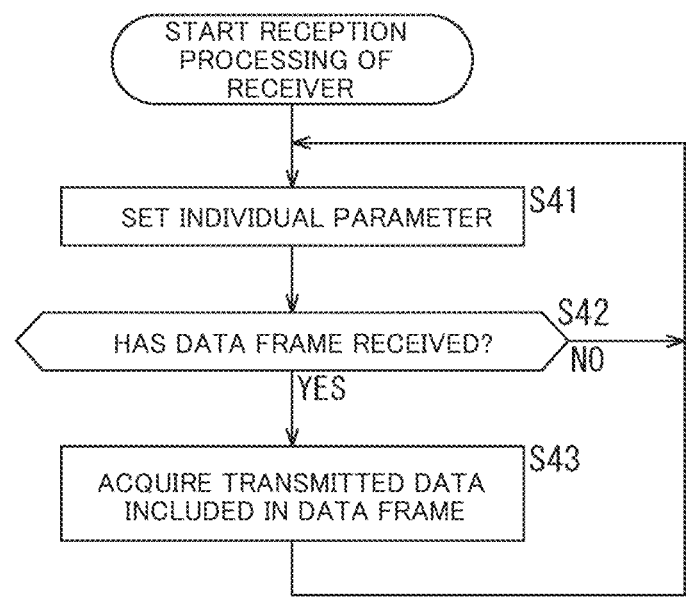
FIG. 17 is a flowchart describing reception processing of a receiver.

Processing of FIG. 17 is performed, for example, after an individual parameter of a predetermined transmitter is acquired through processing of FIG. 16.

In step S41, the transmission parameter setting unit 123 sets the individual parameter in the LPWA communication unit 111. In the LPWA communication unit 111, data frame reception processing is performed on the basis of the individual parameter.

In step S42, the data frame analysis unit 125 determines whether a data frame has been received by the LPWA communication unit 111.

When it is determined that the data frame has been received in step S42, the data frame analysis unit 125 analyzes the data frame supplied from the LPWA communication unit 111 and acquires transmitted data in step S43. The transmitted data acquired by the data frame analysis unit 125 is output to the network communication unit 114, for example, and transmitted to a predetermined server that manages the transmitted data.

After the transmitted data is acquired or when it is determined that the data frame has not been received in step S42, processing returns to step S41 and the aforementioned processing is repeated.

The aforementioned processing is performed by each receiver 12.

Operation of Cloud Server

Figure 18:
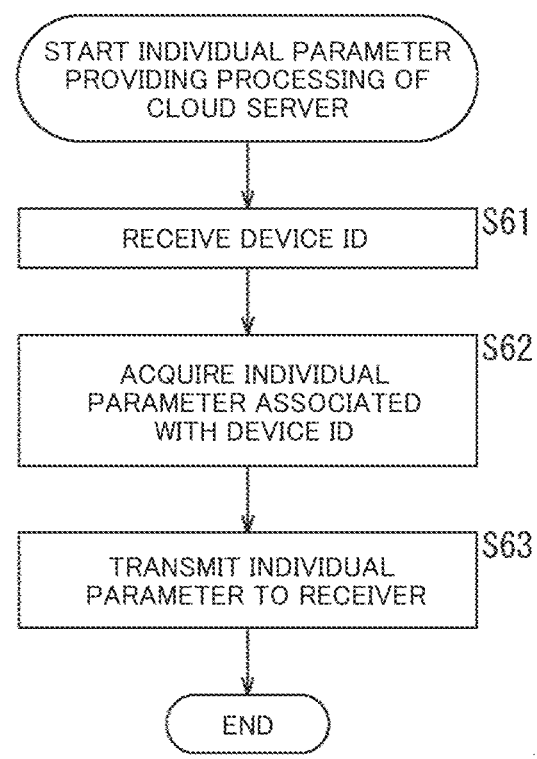
FIG. 18 is a flowchart describing individual parameter providing processing of a cloud server.

Next, processing of the cloud server 1 for providing an individual parameter will be described with reference to a flowchart of FIG. 18.

In step S61, the communication unit 209 of the cloud server 1 receives a device ID transmitted from the receiver 12. The device ID received by the communication unit 209 is supplied to the transmission parameter management unit 201A.

In step S62, the transmission parameter management unit 201A reads and acquires an individual parameter associated with the device ID received by the communication unit 209 from the storage unit 208.

In step S63, the communication unit 209 transmits the individual parameter acquired by the transmission parameter management unit 201A to the receiver 12 that has transmitted the device ID.

The aforementioned processing is performed whenever a device ID is transmitted from a predetermined receiver 12. Individual parameters of a plurality of transmitters 11 are registered with the receiver 12 that has transmitted the device ID to the cloud server 1.

According to the aforementioned processing, the cloud server 1 can provide an individual parameter necessary for each receiver 12. Accordingly, it is possible to curb unnecessary transmission and reception of an individual parameter.

MODIFIED EXAMPLES

Modified Example 1

Although it is assumed that communication between a transmitter and a receiver is unidirectional communication, bidirectional communication is possible.

In a case where communication between a transmitter and a receiver, for example, is bidirectional communication, the receiver that has received a control frame transmitted from the transmitter returns ACK to the transmitter that has transmitted the control frame and acquires an individual parameter as described above.

When ACK is returned, the transmitter can confirm that the individual parameter thereof has been registered with the receiver through ACK. Subsequently, the transmitter can stop transmission of a control frame.

Modified Example 2

Although it is assumed that synchronization pattern information is included in an individual parameter and provided from the cloud server 1 to a receiver, a random number pattern (encryption key) superposed on a synchronization signal and data may be provided. Accordingly, it is possible to improve confidentiality of communication.

In this case, a receiver superposes the random number pattern provided from the cloud server 1 on a synchronization signal and data, detects the synchronization signal included in a data frame transmitted by a transmitter and acquires the data. The transmitter superposes the same random number pattern as the random number pattern provided to the receiver on the synchronization signal and the data and transmits the data frame including the synchronization signal and the data encrypted according to superposition of the random number pattern.

Modified example 3 When a data frame is transmitted, the same data frame may be repeatedly transmitted from a transmitter multiple times. In a receiver, a plurality of received signals are combined to acquire a received signal of a single data frame. Accordingly, it is possible to an S/N ratio of a received signal.

Here, data with the same contents is transmitted multiple times so that a time for which a single transmitter present in a reception area occupies a communication band increases. Since crosstalk occurrence frequency increases when a time for which a communication band is occupied increases, occurrence of crosstalk is curbed by performing frequency hopping with different patterns for respective transmitters in the communication system disclosed in PTL 1. In this case, frequency hopping patterns are shared between transmitters and receivers as individual transmission parameters, and a receiver performs processing of receiving a frequency in the same frequency hopping pattern as that of a transmitter.

In this manner, it is possible to widen a reception area by improving an S/N ratio of a received signal with respect to a data frame.

On the other hand, although a control frame is transmitted using a system common parameter, crosstalk easily occurs when a small number of frequency hopping patterns is included in the system common parameter and reception processing load of a receiver increases when a large number of frequency hopping patterns is included in the system common parameter. Accordingly, it is difficult to perform frequency hopping in the same manner as for data frames in order to curb occurrence of crosstalk.

Accordingly, with respect to a control frame, it is difficult to improve an S/N ratio by combining received signals, and there is a reception area difference between a data frame and a control frame.

In a case where a control frame includes error correction code, it is possible to extend a reception area of the control frame by adjusting error correction performance. In this manner, error correction code may be included in a control frame. Meanwhile, since a data frame and a control frame have the same frame format, error correction code may be added to both the data frame and the control frame.

Error Correction Performance Adjustment Example 1

The amount of information of a payload of a control frame is less than the amount of information of a payload of a data frame. Accordingly, the size of an information word of the control frame can be reduced while the size of a codeword is set to the same size as a codeword of the data frame, and consequently, the number of correction bits of error correction code of the control frame can be increased.

Accordingly, a control frame reception area can be extended and a difference between the widths of a data frame reception area and the control frame reception area can be eliminated.

Error Correction Performance Adjustment Example 2

Error correction may be performed in a receiver using likelihood of code bit as in a soft decision Viterbi algorithm. In this case, known data is set in an unused part in a payload of a control frame using the fact that the amount of information of the payload of the control frame is less than the amount of information of a payload of a data frame.

Error correction capability of the control frame can be improved by maximizing likelihood of the part of the known data during error correction in the receiver.

Accordingly, a control frame reception area can also be extended and a difference between the areas of a data frame reception area and the control frame reception area can also be eliminated.

Configuration Example of Computer

The above-described series of processes can be performed by hardware or performed by software. In a case where the series of processes is performed by software, a program constituting the software is installed in a computer incorporated in dedicated hardware, a general-purpose personal computer, or the like from a program recording medium.

The installed program is provided by being recorded in a removable medium 211 shown in FIG. 14, which is composed of an optical disc (a compact disc-read only memory (CD-ROM), a digital versatile disc (DVD), or the like), a semiconductor memory, or the like. In addition, the program may be provided through a wired or wireless transmission medium such as a local area network, the Internet or digital broadcast. The program can be installed in the ROM 202 or the storage unit 208 in advance.

Meanwhile, the program executed by a computer may be a program processed in a time series according to the order described in the present specification or a program processed in parallel or at necessary timing such as when calling is performed.

In the present specification, a system means a set of a plurality of components (devices, modules (parts), and the like) and whether all the components are included in the same housing does not matter. Accordingly, a plurality of devices accommodated in individual housings and connected through a network and a single device accommodating a plurality of modules accommodated in a single housing are both systems.

The effects described in the present specification are merely illustrative and are not restrictive, and may include other effects.

Embodiments of the present technology are not limited to the above-described embodiments and can be modified in various manners without departing from the scope of the present technology.

For example, the present technology can have a cloud computing configuration in which a single function is divided into a plurality of devices through a network and processed in cooperation.

In addition, each step described in the above-described flowcharts can be divided and executed by a plurality of devices as well as being executed by a single device.

Further, in a case where a single step includes a plurality of processes, the plurality of processes included in the step can be divided and executed by a plurality of devices as well as being executed by a single device.

Combination Example of Components

The present technology can be configured as follows.

(1)

An information processing device including:

a management unit configured to hold non-common setting information that is not common setting information among setting information used in transmitters for setting for transmitting information in association with identification information of the respective transmitters; and a communication unit configured to transmit, to a receiver that has received the identification information transmitted from a predetermined transmitter using common setting information that is the setting information common in the plurality of transmitters, the non-common setting information associated with the identification information received by the receiver.

(2)

The information processing device according to (1), wherein the communication unit is configured to receive the identification information transmitted from the receiver through a network and to transmit the non-common setting information associated with the received identification information through the network.

(3)

The information processing device according to (1) or (2), wherein the setting information is used in the receiver for setting for receiving information transmitted from the transmitter.

(4)

The information processing device according to any one of (1) to (3), wherein transmission of information from the transmitter to the receiver is performed according to unidirectional wireless communication.

(5)

An information processing method including, by an information processing device, holding non-common setting information that is not common setting information among setting information used in transmitters for setting for transmitting information in association with identification information of the respective transmitters; and transmitting, to a receiver that has received the identification information transmitted from a predetermined transmitter using common setting information that is the setting information common in the plurality of transmitters, the non-common information associated with the identification information received by the receiver.

(6)

A transmitter including:

a transmission unit configured to transmit identification information thereof according to common setting information that is common in a plurality of other transmitters among setting information used for setting for transmitting information and to transmit predetermined information according to non-common setting information that is not common setting information.

(7)

The transmitter according to (6), wherein the transmission unit is configured to repeatedly transmit the identification information at a predetermined interval.

(8)

The transmitter according to (7), wherein the transmission unit is configured to increase the transmission interval of the identification information with elapse of time.

(9)

The transmitter according to any one of (6) to (8), wherein the transmission unit is configured to add the same synchronization signal as a synchronization signal indicated by the common setting information and used when the other transmitters transmit their identification information to the identification information and to transmit the identification information.

(10)

The transmitter according to any one of (6) to (9), wherein the transmission unit is configured to multiplex the identification information through the same multiplexing method as a multiplexing method indicated by the common setting information and used when the other transmitters transmit their identification information and to transmit the multiplexed identification information.

(11)

A transmission method including, by a transmitter, transmitting identification information of the transmitter according to common setting information that is common in a plurality of other transmitters among setting information used for setting for transmitting information; and transmitting predetermined information according to non-common setting information that is not common setting information.

(12)

A receiver including:

a reception unit configured to receive identification information transmitted from a predetermined transmitter according to common setting information that is common in a plurality of transmitters among setting information used in the transmitters for setting for transmitting information; and an acquisition unit configured to acquire non-common setting information associated with the received identification information from an information processing device which holds the non-common setting information that is not common in association with the identification information of the respective transmitters.

(13)

The receiver according to (12), wherein the acquisition unit is configured to transmit the received identification information to the information processing device through a network, and to receive and acquires the non-common setting information transmitted from the information processing device through the network.

(14)

The receiver according to (12) or (13), wherein the reception unit is configured to perform setting for receiving information to be transmitted by the transmitter according to the non-common setting information and to receive predetermined information transmitted from the transmitter using the same information as the non-common setting information.

(15)

The receiver according to any one of (12) to (14), wherein the reception unit is configured to detect the same synchronization signal as a synchronization signal indicated by the common setting information and used when the plurality of transmitters transmit their identification information and to receive the identification information added with the synchronization signal and transmitted.

(16)

The receiver according to any one of (12) to (15), wherein the reception unit is configured to receive the identification information multiplexed through the same multiplexing method as a multiplexing method indicated by the common setting information and used when the plurality of transmitters transmit their identification information and transmitted.

(17)

A reception method including, by a receiver, receiving identification information transmitted from a predetermined transmitter according to common setting information that is common in a plurality of transmitters among setting information used in the transmitters for setting for transmitting information; and acquiring non-common setting information associated with the received identification information from an information processing device which holds the non-common setting information that is not common setting information in association with the identification information of the respective transmitters.

REFERENCE SIGNS LIST

1 Cloud server
11 Transmitter
12 Receiver
21 Transmitted data generation unit
22 Control unit
23 LPWA communication unit
24 GPS reception unit
31 Transmission parameter setting unit
32 Device ID storage unit
33 Control frame generation unit
34 Data frame generation unit
111 LPWA communication unit
112 GPS reception unit
113 Control unit
114 Network communication unit
121 Transmission parameter acquisition unit
122 Reception target management unit
123 Transmission parameter setting unit
124 Control frame analysis unit
125 Data frame analysis unit

The invention claimed is:

1. A receiver comprising:

circuitry configured to receive identification information included in a control frame which is transmitted from a predetermined transmitter, according to common setting information that is common in a plurality of transmitters among setting information used in the transmitters for setting for transmitting information, the control frame including error correction code;

acquire non-common setting information associated with the received identification information from an information processing device, the information processing device managing the non-common setting information that is not common in the plurality of transmitters in association with the identification information of the respective transmitters; and set individual parameter associated with the predetermined transmitter corresponding to the received identification information, to receive a data frame from the predetermined transmitter, the data frame including error correction code, the error correction being performed by using likelihood of code bits.

2. The receiver according to claim 1, wherein the circuitry is configured to transmit the received identification information to the information processing device through a network, and receive and acquire the non-common setting information transmitted from the information processing device through the network.

3. The receiver according to claim 1, wherein the circuitry is configured to perform setting for receiving the data frame information to be transmitted by the predetermined transmitter according to the non-common setting information and to receive the data frame based on the non-common setting information.

4. The receiver according to claim 1, wherein the circuitry is configured to detect a synchronization signal which is same as a synchronization signal indicated by the common setting information that is used when the plurality of transmitters transmit their identification information, and to receive the identification information added to the synchronization signal.

5. The receiver according to claim 4, wherein
the circuitry is configured to receive a random number pattern used for the synchronization signal and the data frame, and to receive the synchronization signal and the data frame encrypted based on the random number pattern, from the predetermined transmitter.

6. The receiver according to claim 1, wherein
the circuitry is configured to receive the identification information multiplexed through a multiplexing method which is same as a multiplexing method indicated by the common setting information that is used when the plurality of transmitters transmit their identification information.

7. The receiver according to claim 1,
wherein known data is set in an unused part in a payload of the control frame using in accordance with that an amount of information of the payload of the control frame is less than an amount of information of a payload of the data frame.

8. The receiver according to claim 1,
wherein the circuitry is configured to transmit acknowledgement information to the predetermined transmitter n response to receiving the identification information, in addition to setting the individual parameter associated with the predetermined transmitter corresponding to the received identification information,
wherein the transmitter is configured to stop transmitting the control frame after receiving the acknowledgement information from the receiver.

9. A reception method for a receiver comprising;
receiving identification information included in a control frame which is transmitted from a predetermined transmitter, according to common setting information that is common in a plurality of transmitters among setting information used in the transmitters for setting for transmitting information, the control frame includin T error correction code;

acquiring non-common setting information associated with the received identification information from an information processing device, the information processinge device managing the non-common setting information that is not common in the plurality of transmitters in association with the identification information of the respective transmitters; and setting individual parameter associated with the predetermined transmitter corresponding to the received identification information, to receive a data frame from the predetermined transmitter, the data frame including error correction code, the error correction being performed by using likelihood of code bits.

* * * * *